(12) United States Patent
Nagai et al.

(10) Patent No.: US 10,156,471 B2
(45) Date of Patent: Dec. 18, 2018

(54) COMBINATION SCALE

(71) Applicant: Yamato Scale Co., Ltd., Akashi-shi, Hyogo (JP)

(72) Inventors: Takayuki Nagai, Akashi (JP); Masafumi Takimoto, Akashi (JP)

(73) Assignee: YAMATO SCALE Co., Ltd., Hyogo (JP)

( * ) Notice: Subject to any disclaimer, the term of this patent is extended or adjusted under 35 U.S.C. 154(b) by 0 days.

(21) Appl. No.: 15/507,590

(22) PCT Filed: Dec. 17, 2015

(86) PCT No.: PCT/JP2015/006296
§ 371 (c)(1),
(2) Date: Feb. 28, 2017

(87) PCT Pub. No.: WO2017/103961
PCT Pub. Date: Jun. 22, 2017

(65) Prior Publication Data
US 2018/0274970 A1    Sep. 27, 2018

(51) Int. Cl.
*G01G 23/16* (2006.01)
*G01G 19/387* (2006.01)
*B65B 1/32* (2006.01)
*G01G 23/01* (2006.01)

(52) U.S. Cl.
CPC ............ *G01G 23/01* (2013.01); *B65B 1/32* (2013.01); *G01G 19/387* (2013.01); *G01G 23/163* (2013.01)

(58) Field of Classification Search
CPC .... G01B 21/02; G01G 19/387; G01G 23/163; B65B 1/32
See application file for complete search history.

(56) References Cited

U.S. PATENT DOCUMENTS

2010/0224421 A1* 9/2010 Kawanishi ........... G01G 19/393
177/25.18

FOREIGN PATENT DOCUMENTS

| JP | 60-052722 A | 3/1985 |
| JP | 09-079895 A | 3/1997 |
| JP | 09-318426 A | 12/1997 |
| JP | 2011-196762 A | 10/2011 |
| JP | 2012-229977 A | 11/2012 |
| JP | 2013-120121 A | 6/2013 |

* cited by examiner

*Primary Examiner* — Janet Suglo
(74) *Attorney, Agent, or Firm* — Norris McLaughlin, P.A.

(57) ABSTRACT

A combination scale is provided that includes a combinatorial computation unit and two operation modes; a normal operation mode, and a corrective operation mode in which correction values are decided. The correction values are for use in correcting errors of measured weight values calculated from weight signals of weight sensors. In the normal operation mode, the combinatorial computation unit corrects the measured weight values using the correction values decided in the corrective operation mode. Then, the combinatorial computation unit executes combinatorial computations based on the corrected measured weight values.

7 Claims, 14 Drawing Sheets

COMBINATION SCALE

BACKGROUND OF THE INVENTION

This invention relates to a combination scale operable to weigh articles, such as foodstuffs including snacks and fruits, and combine them into groups of a predetermined quantity.

Conventionally, combination scales are structurally characterized as described below. A dispersing feeder receives articles to be weighed and feeds them into a plurality of linear feeders disposed around the dispersing feeder. The linear feeders deliver outwardly the received articles to be weighed and feed them into a plurality of feeding hoppers. The feeding hoppers temporarily store therein the articles to be weighed and open their discharge gates to feed the articles into a plurality of weighing hoppers respectively disposed below the feeding hoppers.

A combination scale weighs the articles in the weighing hoppers and executes combinatorial computations using the measured weight values. The combinatorial computations refer to computations in which the measured weight values of the articles are variously combined to select from the various combinations an optimal quantity combination of weighing hoppers having a combinational weight; a total weight of the articles in the selected weighing hoppers, equal to or most approximate to a target combinational weight. Then, the combination scale discharges the articles from the optimal quantity combination of weighing hoppers selected by the combinatorial computations (for example, refer to Japanese Unexamined Patent Publication No. 2012-229977).

In the meantime, a combination weighing apparatus has been developed and disclosed with an aim to easily know any abnormal status during weighing cycles. This weighing apparatus detects the weighing accuracy of each weighing hopper to determine whether the weighing hopper is performing well or performing poorly (refer to Japanese Unexamined Patent Publication No. 2011-196762).

SUMMARY OF THE INVENTION

Conventionally, there may be errors between measured weights of the articles weighed in the weighing hoppers and real weights of the articles thrown in the weighing hoppers under the influences from vibrations of the combination scale per se and floor vibrations in a production site where the combination scale is installed. The weighing apparatus described Japanese Unexamined Patent Publication No. 2011-196762, however, can only determine the weighing accuracy of each weighing hopper. This patent literature, on the other hand, is totally silent about how to deal with such errors associated with the weighing hoppers.

To address this issue, this invention is directed to achieving improvements in weighing accuracy by correcting any errors of measured weight values obtained by the weighing hoppers and executing the combinatorial computations based on the corrected weight values.

To this end, the invention provides a combination scale technically and structurally characterized as described below.

A combination scale is provided that includes:
a dispersing feeder configured to receive articles to be weighed and disperse the articles around;
a plurality of linear feeders disposed around the dispersing feeder and configured to deliver the articles to be weighed received from the dispersing feeder and discharge the articles from delivery ends thereof;
a plurality of feeding hoppers configured to temporarily store the articles to be weighed discharged from the delivery ends of the linear feeders and then discharge the articles downward;
a plurality of weighing hoppers configured to temporarily store the articles to be weighed discharged from the feeding hoppers and then discharge the articles;
a plurality of weight sensors configured to detect weights of respective ones of the weighing hoppers;
a combinatorial computation unit configured to calculate measured weight values of the articles to be weighed stored in the weighing hoppers from weight signals of the weight sensors, the combinatorial computation unit being further configured to execute combinatorial computations based on the measured weight values of the articles that are calculated; and
a control device configured to control the weighing hoppers based on a result obtained from the combinatorial computations, the control device being further configured to control the dispersing feeder, the linear feeders, and the feeding hoppers,
the combination scale including, as operation modes:
a normal operation mode; and
a corrective operation mode in which correction values are decided, the correction values being for use in correcting errors of the measured weight values calculated from the weight signals of the weight sensors, wherein
in the normal operation mode, the combinatorial computation unit corrects, using the correction values, the measured weight values of the articles to be weighed stored in the weighing hoppers that are calculated from the weight signals of the weight sensors, and executes the combinatorial computations based on the measured weight values that are corrected.

According to this invention, the correction values, which are used to correct errors of the measured weight values calculated by way of the weight sensors provided correspondingly to the weighing hoppers, are decided beforehand in the corrective operation mode. Then, the measured weight values are corrected in the normal operation mode based on the correction values decided in the corrective operation mode, and the combinatorial computations are executed based on the error-corrected measured weight values. Thus, the combinatorial computations are executed based on the measured weight values improved in accuracy. This may conduce to improvements in weighing accuracy.

In the combination scale according to preferred aspects of the invention, the dispersing feeder is not fed with the articles to be weighed and test articles of known weights are mounted in the weighing hoppers in the corrective operation mode, and the combination scale further includes a correction value deciding unit configured to decide the correction values in the corrective operation mode based on the known weights and measured weight values of the test articles in the weighing hoppers calculated by the combinatorial computation unit.

According to these aspects, the corrective operation mode is run in the combination scale unfed with the articles to be weighed, with the test articles of known weights being mounted in the weighing hoppers. The correction value deciding unit may accordingly decide the correction values used to correct errors of the measured weight values based on the known weights of the test articles and measured weight values in the weighing hoppers calculated by the combinatorial computation unit.

In the combination scale according to other aspects of the invention, the dispersing feeder is not fed with the articles to be weighed and the weighing hoppers are assumed to contain virtual articles of known virtual weights in the corrective operation mode, and the combination scale further includes a correction value deciding unit configured to decide the correction values in the corrective operation mode based on the known virtual weights and measured weight values of the virtual articles in the weighing hoppers calculated by the combinatorial computation unit.

According to these aspects, the corrective operation mode is run in a state that the combination scale is unfed with the articles to be weighed, test articles are not mounted in the weighing hoppers, and the weighing hoppers are assumed to contain the virtual articles of known virtual weights. The correction value deciding unit may accordingly decide the correction values used to correct errors of the measured weight values based on the known virtual weights of the virtual articles and measured weight values calculated by the combinatorial computation unit.

In the combination scale according to one aspect of the invention, the combinatorial computation unit calculates the measured weight values of the virtual articles in the weighing hoppers in the corrective operation mode based on corrected zero-point correction values obtained by correcting zero-point correction values of the weighing hoppers using the known virtual weights. The zero-point correction values are for use in calculating the measured weight values from the weight signals of the weight sensors.

According to this aspect, the combinatorial computation unit calculates the measured weight values in the corrective operation mode based on the corrected zero-point correction values obtained by correcting the zero-point correction values, which are used to calculate the measured weight values of the weighing hoppers, using the known virtual weights. To be specific, a zero point; reference point of calculating the measured weight value, is shifted in accordance with each virtual weight to calculate the measured weight value. The measured weight values, therefore, may be calculated based on the assumption that the weighing hoppers, though they are really empty, are currently containing the virtual articles of the virtual weights.

The correction value deciding unit may decide the correction values for correction of errors of the measured weight values based on the known virtual weights of the virtual articles and measured weight values calculated by the combinatorial computation unit.

According to preferred aspects of the invention, the combination scale further includes: a variation determining unit configured to calculate, in the corrective operation mode, a variation in the measured weight values of each one of the weighing hoppers obtained from the weight signals of the weight sensors, the variation determining unit being further configured to determine whether the variation is greater than a predetermined variation; and a variation broadcasting unit configured to broadcast an indication of the variation being greater than the predetermined variation when determined so by the variation determining unit.

According to these aspects, when the variation in the measured weight values of each one of the weighing hoppers obtained from the weight signals of the weight sensors is greater than the predetermined variation, possibly failing to accurately correct the associated measured weight value, the weighing hopper having such a widely variable weight may be identified and broadcasted to an operator.

In the combination scale according to other aspects of the invention, the correction value deciding unit calculates the error based on a predetermined number of the measured weight values and the known weight of the test articles for each one of the weighing hoppers, and the correction value deciding unit uses the errors calculated as the correction values.

According to these aspects, the correction value deciding unit, by thus calculating the error based on a predetermined number of the measured weight values of the test articles, may calculate an error reflecting a variation tendency of the measured weight values of each weighing hopper. The correction value deciding unit may determine each error thus calculated as each correction value. In the normal operation mode, therefore, each error may be corrected so as to cancel each error using each correction value.

In the combination scale according to preferred aspects of the invention, the correction value deciding unit calculates the error based on a predetermined number of the measured weight values and the known virtual weight of the virtual articles for each one of the weighing hoppers, and the correction value deciding unit uses the errors calculated as the correction values.

According to these aspects, the correction value deciding unit, by thus calculating the error based on a predetermined number of the measured weight values of the virtual articles, may calculate an error reflecting a variation tendency of the measured weight values of each weighing hopper. The correction value deciding unit may determine each error thus calculated as each correction value. In the normal operation mode, therefore, each error may be corrected so as to cancel each error using each correction value.

The combination scale according to other aspects of the invention further includes a corrective operation mode setting unit to be manipulated to set the corrective operation mode.

According to these aspects, the corrective operation mode may be set and run.

According to this invention, the correction values, which are used to correct the errors of the measured weight values calculated by way of the weight sensors provided correspondingly to the weighing hoppers, are decided in the corrective operation mode. In the normal operation mode, the measured weight values are corrected based on the correction values decided, and the combinatorial computations are executed based on the corrected measured weight values. Thus, the combinatorial computations are executed based on the measured weight values improved in accuracy. This may conduce to improvements in weighing accuracy.

DETAILED DESCRIPTION OF THE INVENTION

First Embodiment

An embodiment of this invention is hereinafter described in detail referring to the accompanying drawings.

Figure 1:
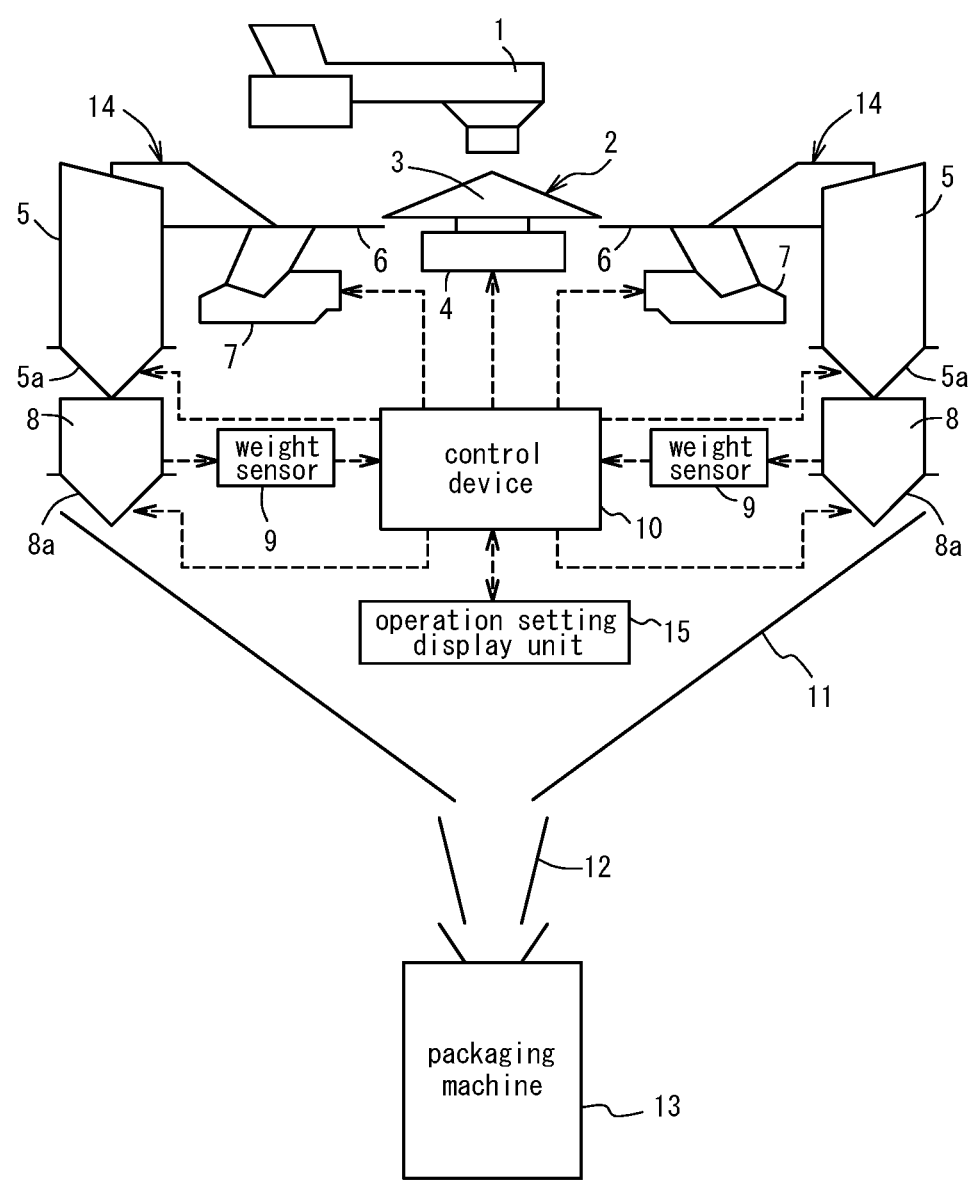
FIG. 1 is a schematic drawing of a combination scale according to an embodiment of the invention.

FIG. 1 is a schematic drawing of a combination scale according to an embodiment of the invention.

The combination scale according to this embodiment has a dispersing feeder 2 at the center in its upper section. The dispersing feeder 2 receives articles to be weighed from a feeding device 1 and radially disperses the received articles by way of vibrations. The dispersing feeder 2 has a conical top cone 3 to be fed with the articles, and a vibration mechanism 4 that vibrates the top cone 3

The articles to be weighed are transported on a belt conveyer, not illustrated in the drawing, to the feeding device 1. The feeding device 1 feeds the received articles by way of vibrations to a central section of the top cone 3. The articles delivered from the feeding device 1 and received by the top cone 3 in its central section are moved by way of vibrations toward the peripheral edge of the top cone 3.

Around the top cone 3 are radially disposed a plurality of linear feeders 14. The linear feeders 14 receive the articles to be weighed from the top cone 3 and deliver them linearly outward by way of vibrations. The linear feeders 14 each have a gutter-like feeder pan 6 to be fed with the articles, and a vibration mechanism 7 that vibrates the feeder pan 6.

On the peripheral edges of the feeder pans 6 are circumferentially disposed a plurality of feeding hoppers 5, and a plurality of weighing hoppers 8 arranged correspondingly to the feeding hoppers 5. The feeding hoppers 5 each have, at its lower opening, an openable and closable gate 5a for discharge. The weighing hoppers 8 each have, at its lower opening, an openable and closable gate 8a for discharge.

The feeding hopper 5 temporarily stores therein the articles to be weighed received from the feeder pan 6. Each of the feeding hoppers 5, when the weighing hopper 8 therebelow becomes empty, opens the discharge gate 5a to feed the articles to be weighed into the empty weighing hopper 8. The weighing hoppers 8 are each coupled to and supported by a weight sensor 9. An example of the weight sensor may be a load cell. The weight sensors 9 weigh the articles in the corresponding ones of the weighing hoppers 8. The weight sensors 9 output weight signals to a control device 10.

The linear feeder 14, feeding hopper 5, weighing hopper 8, and weight sensor 9 constitute a set of weighing heads. The combination scale has a plurality of weighing heads; 14 sets of weighing heads in the illustrated example.

The control device 10 has an AD converter circuit. The control device 10 amplifies, in this AD converter circuit, analog weight signals outputted from the weight sensors 9. The control device 10 obtains AD-converted values by performing AD conversion of the amplified analogue weight signals at predetermined time intervals using an AD converter of the AD converter circuit. The control device 10 further converts the AD-converted values into real weight values. The control device 10 corrects the obtained weight values using zero-point correction values when the weighing hoppers 8 are empty (tare weights) to calculate the measured weight values of the articles present in the weighing hoppers 8.

The control device 10 executes combinatorial computations based on the measured weight values thus calculated of the articles to be weighed, and selects, from all of the weighing hoppers 8, an optimal quantity combination of weighing hoppers 8 from which the articles should be discharged. In response to a discharge request signal inputted from a packaging machine 13, the control device 10 opens the discharge gates 8a of the selected optimal quantity combination of weighing hoppers 8 to discharge the articles into a collecting chute 11. The articles thus discharged are thrown into the packaging machine 13 through a collecting funnel 12 below the collecting chute 11, and then packaged.

An operation setting display unit 15 according to this embodiment includes, for example, a touch panel. The operation setting display unit 15 has functions as a setting unit operated for setting the operation of the combination scale and operational parameters such as stability time that defines the timing of obtaining the weight value from the filtered weight signal, filter constants, and operation modes. The operation setting display unit 15 displays, on its screen, a speed of operation, a combinational weight value, and other values to be set. The operation setting display unit 15 further includes, as described later, features as a broadcasting unit that broadcasts an indication of large variation when determined that the measured weight variation of each weighing hopper 8 is greater than a predetermined variation.

The control device 10 controls the operation of the feeding device 1 and the general operation of the whole combination scale. The control device 10 further executes the combinatorial computations. The combinatorial computations according to this embodiment are executed to select an optimal quantity combination of weighing hoppers 8 from all of the weighing hoppers 8. The optimal quantity combination of weighing hoppers 8 selected then is a combination of weighing hoppers 8 having a combinational weight; a total weight as a result of variously combining the weight values of the articles to be weighed, equal to a target combinational weight, or heavier than and most approximate to the target combinational weight.

Figure 2:
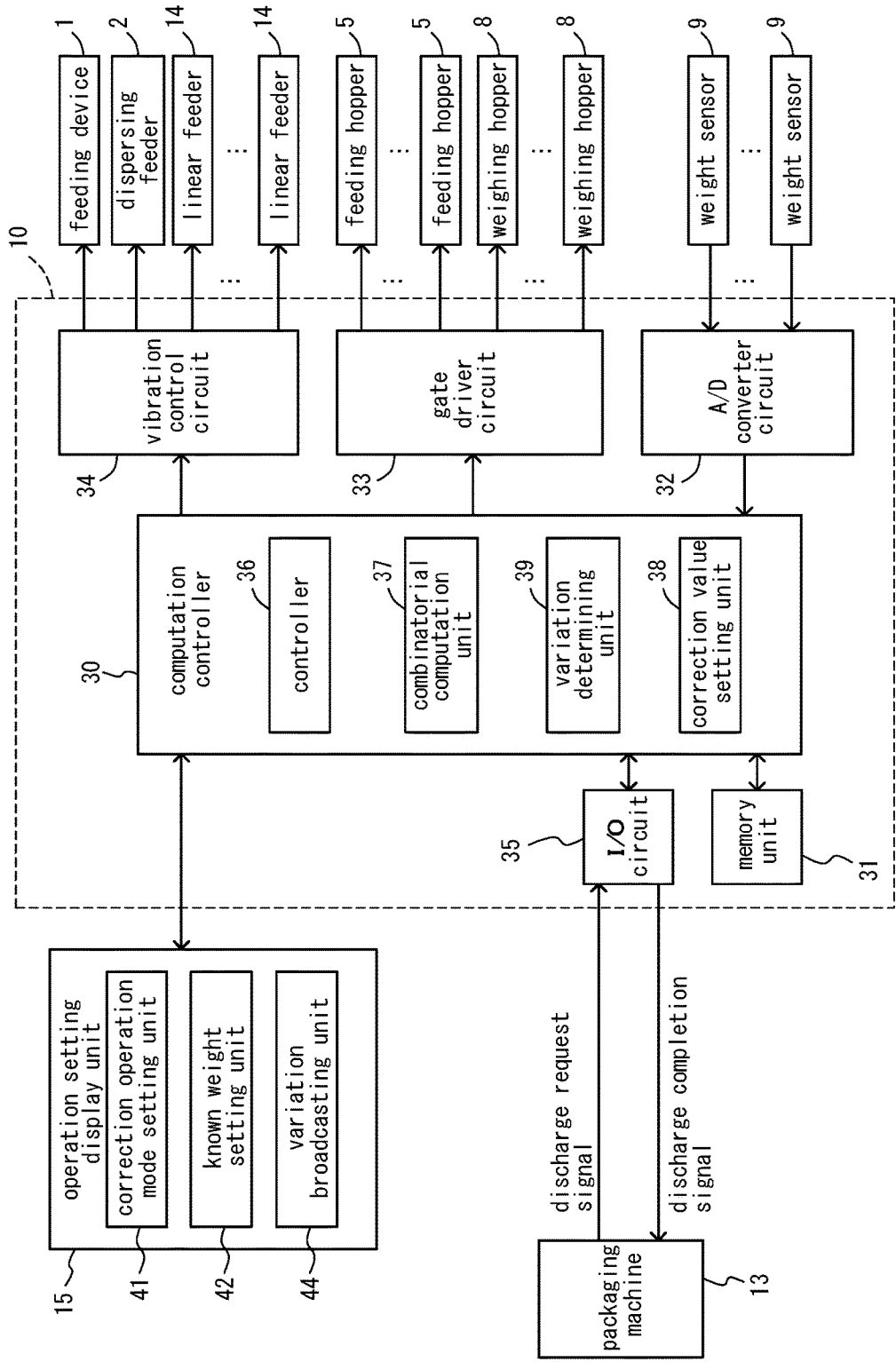
FIG. 2 is a block diagram, schematically illustrating a control system in the combination scale.

FIG. 2 is a block diagram, schematically illustrating a control system in the combination scale. The same structural elements of this drawing as those illustrated in FIG. 1 are indicated by the same reference signs.

The control device 10 includes a computation controller 30, a memory unit 31, an AD converter circuit 32, a gate driver circuit 33, a vibration control circuit 34, and an I/O circuit 35. To the AD converter circuit 32 are inputted the analog weight signals outputted from the weight sensors 9 respectively supporting the weighing hoppers 8. The gate driver circuit 33 drives the discharge gates 5a and 8a of the feeding hoppers 5 and the weighing hoppers 8. The vibration control circuit 34 controls the vibrations of the feeding device 1 and the feeders 2 and 14. The I/O circuit 35 is connected to the packaging machine 13.

The computation controller 30 includes a CPU. The computation controller 30 controls the respective structural elements and executes combinatorial and filtering computations. The computation controller 30 includes features of a controller 36 and a combinatorial computation unit 37. The combinatorial computation unit 37 calculates the measured weight values of the articles to be weighed in the weighing hoppers 8 from the filtered weight signals of the weight sensors 9, and executes the combinatorial computations based on the calculated measured weight values.

In this embodiment, as described later, the computation controller 30 includes features of a correction value deciding unit 38 and a variation determining unit 39. The correction value deciding unit 38 decides correction values for use in correcting errors of the measured weight values of the weighing hoppers 8. The variation determining unit 39 calculates a variation in the measured weight values of each weighing hopper 8 and determines whether the variation is greater than a predetermined variation.

In the memory unit 31 are stored operation programs of the combination scale and operational parameters to be set. The memory unit 31 further serves as a work region for the computation controller 30 to execute the computations The AD converter circuit 32 amplifies the analog weight signals outputted from the weight sensors 9 that detected the weights of the articles in the weighing hoppers 8 and converts the amplified analog weight signals into digital weight signals by sampling them in the AD converter at predetermined time intervals and then outputs the converted digital weight signals to the computation controller 30.

The computation controller 30 converts the digital signals outputted from the AD converter circuit 32 into real weight values, and applies a filtering process to the obtained weight values. The computation controller 30 and the memory unit 31 constitute a digital filter for the filtering process. Examples of the digital filter may include an FIR filter and a moving average filter that performs multiple moving averaging.

The gate driver circuit 33, based on control signals outputted from the computation controller 30, opens and closes the discharge gates 5a and 8a of the feeding hoppers 5 and the weighing hoppers 8. The vibration control circuit 34, based on the control signals outputted from the computation controller 30, controls the vibrations of the feeding device 1, dispersing feeder 2, and linear feeders 14. The computation controller 30 is connected to the operation setting display unit 15 to allow for mutual communication therebetween.

The computation controller 30 runs the operation programs stored in the memory unit 31, and the control device 10 thereby controls the general operation of the whole combination scale.

The combination scale requires a large number of various operational parameters to be set. An operator is in charge of setting such operational parameters by manipulating the operation setting display unit 15. The values of the set operational parameters are transmitted to the computation controller 30 and stored in the memory unit 31. The operational parameters to be set may include stability time that defines the timing of obtaining the weight value from the filtered weight signal, filter constants, a target combinational weight to be obtained by the combinatorial computations as well as an allowable range of the target combinational weight, and vibration strengths and amounts of driving time of the feeders 2 and 14.

Conventionally, there may be errors between the measured weights of the articles weighed by the weighing hoppers 8 and real weights of the articles present in the weighing hoppers 8 under the influences from vibrations of the combination scale per se and floor vibrations in a production site where the combination scale is installed.

The combination scale according to this embodiment includes two operation modes; a normal operation mode, and a corrective operation mode. In the normal operation mode, the combination scale is fed with the articles to be weighed and operated as usual. On the other hand, the corrective operation mode is a mode for deciding correction values used to correct the errors between the weight values measured by the weighing hoppers 8 and the real weight values of the weighing hoppers 8. In the corrective operation mode, the correction values are decided without feeding the combination scale with the articles to be weighed.

When, for example, the combination scale according to this embodiment is installed in a production site, the corrective operation mode is initially run to decide the correction values for correction of the errors of the weight values measured by the weighing hoppers 8. Then, the normal operation mode; a mode to be set for the normal operation, is run, in which the measured weight values of the articles measured by the weighing hoppers 8 are corrected based on the correction values, and the combinatorial computations are executed based on the error-corrected measured weight values.

According to this embodiment, the corrective operation mode is run in the combination scale unfed with the articles to be weighed, with test articles of known weights, for example, balance weights as substantially heavy as the articles to be weighed, being mounted in the weighing hoppers 8 in a manner that the test articles are not dischargeable from the weighing hoppers 8 when their discharge gates 8a are opened. The combination scale is accordingly operated as if articles as substantially heavy as the balance weights of the known weights are mounted in the weighing hoppers 8. The balance weight is a non-limiting example of the test article. Instead, articles to be weighed of known weights may be mounted in the weighing hoppers 8 in a manner that the articles are not dischargeable from the weighing hoppers 8 when their discharge gates 8a are opened.

When the corrective operation mode is run, the balance weights of the known weights are mounted in the weighing hoppers 8. Then, the operation setting display unit 15 including features of a corrective operation mode setting unit 41 is manipulated to set the corrective operation mode, and the operation setting display unit 15 including features of a known weight setting unit 42 is manipulated to set the known weights of the balance weights mounted in the weighing hoppers 8.

When the corrective operation mode is set and run after the known weights are set, i.e., when the corrective operation starts, the combination scale is accordingly operated as if the articles as substantially heavy as the balance weights of the known weights are mounted in the weighing hoppers 8 which are really empty.

The computation controller 30 of the combination scale 30 opens and closes the discharge gates 8a of the selected optimal quantity combination of weighing hoppers 8 to discharge the articles from these weighing hoppers upon the arrival of article discharge timings spaced apart at certain time intervals during the corrective operation, regardless of whether the discharge request signal is inputted from the packaging machine 13. After the gates 8a are opened and closed, the computation controller 30, assuming that the articles to be weighed are discharged from the weighing hoppers 8, opens and closes the discharge gates 5a of the associated feeding hoppers 5 to feed the weighing hoppers 8 with new articles to be weighed. After the gates 5a are opened and closed, the computation controller 30, assuming that the articles to be weighed are discharged from the feeding hoppers 5, drives the associated linear feeders 14 for a preset period of time to feed the feeding hoppers 5 with the articles to be weighed. Then, the computation controller 30 drives the dispersing feeder 2 for a preset period of time to feed the linear feeders 14 with the articles to be weighed. Such a weighing cycle including the above actions is repeatedly carried out. This weighing cycle is primarily similar to a weighing cycle in the normal operation mode in which the articles to be weighed are actually fed.

When the combination scale is normally operating, a remaining prevention measure is employed against the risk of undischarged articles remaining in any weighing hoppers 8 left out from the optimal quantity combinations over an extended period of time. The corrective operation of the combination scale also includes such a remaining prevention measure.

Describing the remaining prevention measure, when any weighing hoppers 8 are found to be not included in the optimal quantity combinations at a certain number of times in a row, the combinatorial computations are executed to force such weighing hoppers 8 to be included in the optimal quantity combinations. As a result, all of the weighing hoppers 8 will be ultimately selected as optimal quantity combinations of weighing hoppers.

During the corrective operation in which the weighing hoppers 8 are not actually fed with the articles to be weighed, vibrations associated with the thrown-in articles need not be taken into account. Yet, vibrations do occur at the time of opening and closing the discharge gates 8a of the weighing hoppers 8 selected as an optimal quantity combination by the combinatorial computations.

Figure 3:
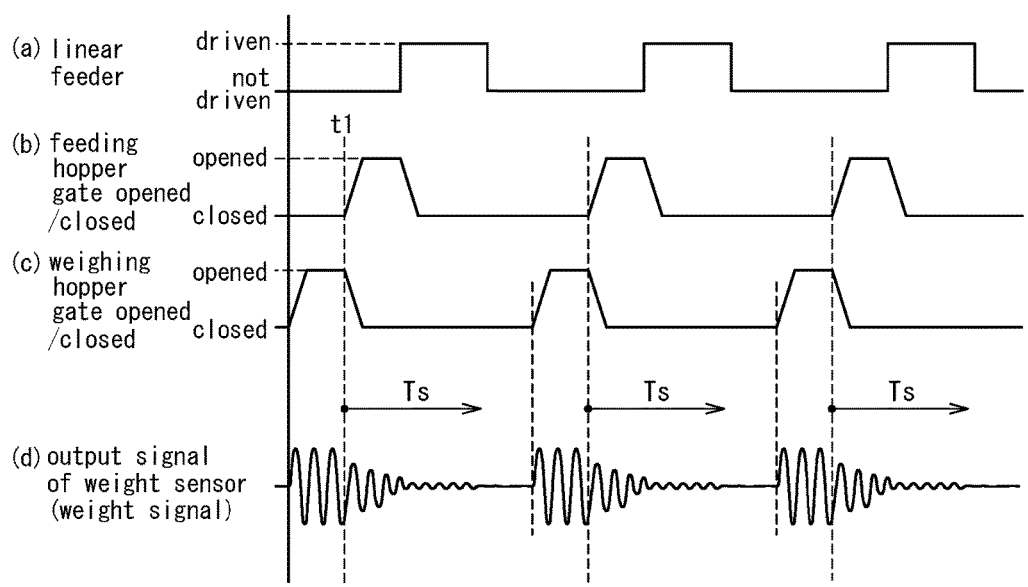
FIG. 3 are timing charts, illustrating an exemplified operation during a corrective operation mode.

FIG. 3 are timing charts, illustrating an exemplified corrective operation. FIG. 3 (*a*) is a timing chart of the linear feeder 14 being driven. FIG. 3 (*b*) is a timing chart of the opening and closure of the discharge gate 5a of the feeding hopper 5. FIG. 3 (*c*) is a timing chart of the opening and closure of the discharge gate 8a of the weighing hopper 8. FIG. 3 (*d*) is a timing chart of the weight signal outputted from the weight sensor 9.

FIG. 3 shows a typical condition of a set of weighing heads that include the linear feeder 14, feeding hopper 5, weighing hopper 8, and weight sensor 9.

During the corrective operation, the combinatorial computations are executed based on the measured weigh values of the balance weights mounted in the weighing hoppers 8, and the discharge gates 8a of an optimal quantity combination of weighing hoppers 8 selected by the combinatorial computations are opened and closed to discharge the articles to be weighed from these weighing hoppers 8, as illustrated in FIG. 3 (*c*). Next, the discharge gates of the associated feeding hoppers 5 are opened and closed to feed the articles to be weighed into the weighing hoppers 8 that are now assumed to be empty after the gates 8a are opened and closed to discharge the articles, as illustrated in FIG. 3 (*b*).

Then, the associated linear feeders 14 are driven for a preset period of time to feed the articles to be weighed into the feeding hoppers 5 that are now assumed to be empty after the gates 5a are opened and closed to discharge the articles, as illustrated in FIG. 3 (*a*). Such a weighing cycle including the above actions is repeatedly carried out.

In this combination scale, a stability time Ts is set, which is a period of time from a starting point, a timing t1, when the discharge gate 5a of the feeding hopper 5 starts to open, to the timing of obtaining the weight value from the filtered weight signal, as illustrated in FIG. 3 (*b*).

Figure 4:
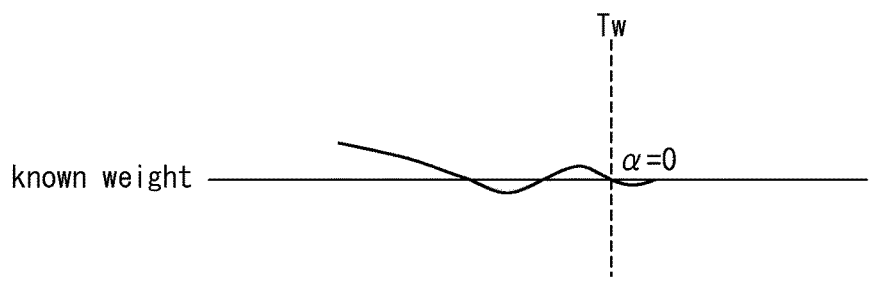
FIG. 4 is a graphic illustration of an exemplified waveform of a weight signal near a weighing timing.
Figure 5:
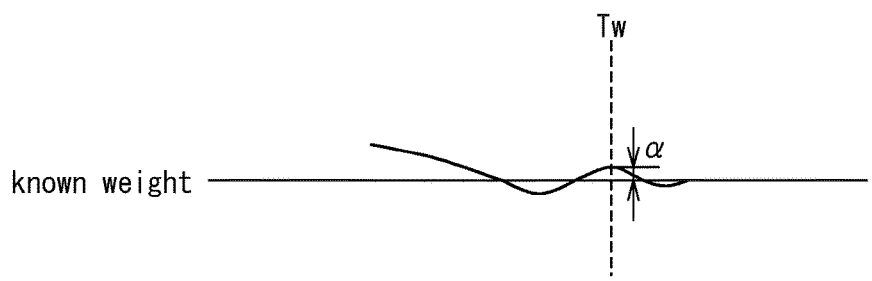
FIG. 5 is a graphic illustration of another exemplified waveform of the weight signal near the weighing timing.
Figure 6:
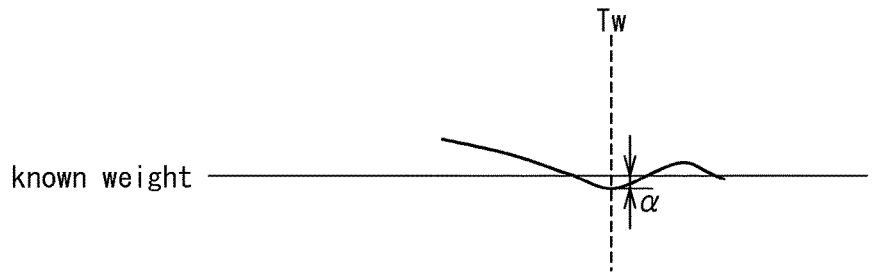
FIG. 6 is a graphic illustration of yet another exemplified waveform of the weight signal near the weighing timing.

FIGS. 4 to 6 are waveform charts near a weighing timing Tw, which is a point in time in the passage of the stability time Ts during the corrective operation.

When the stability time Ts is over, the waveform of the weight signal is supposed to converge to the known weight of the balance weight mounted in the weighing hopper 8. However, the waveform of the weight signal is variable under the influences from vibrations of the combination scale per se and vibrations of a floor on which the combination scale is installed.

For this reason, the weight signal at the weighing timing Tw may correspond to the known weight as illustrated in FIG. 4, or may exceed or fall below the known weight as illustrated in FIG. 5. This generates an error "a" as compared to the known weight which is a real weight.

During the corrective operation, the correction value deciding unit 38 of the computation controller 30 stores therein a predetermined number of measured weight values of each weighing hopper 8 calculated from the weight signals, and then calculates an average value of the predetermined number of measured weight values for each weighing hopper 8. The predetermined number may not be particularly limited in so far as it is more than one. For example, the predetermined number may preferably be a dozen or more, so that the variation tendency of the measured weight values of each weighing hopper 8 is more noticeable.

The correction value deciding unit 38 calculates an error of the measured weight value for each weighing hopper 8 in the formula below using the average weight value of the measured weight values calculated for each weighing hopper 8 and the known weight of the balance weight in each weighing hopper 8.

Error=average of a predetermined number of measured weight values−known weight

The correction value deciding unit 38 decides the calculated errors of the weighing hoppers 8 as correction values, which are stored in the correction value deciding unit 38.

Instead of calculating the average value of a predetermined number of measured weight values, a difference between the known weight and each measured weight value may be calculated, and an average value of a predetermined number of differences may be used as the error.

The variation determining unit 39 of the computation controller 30 calculates, for each weighing hopper 8, a standard deviation, i.e., variation of a predetermined number of measured weight values. When the calculated standard deviation of the measured weight values is greater than a predetermined standard deviation, the variation determining unit 39 broadcasts the result by, for example, displaying an indication of such large variation on the operation setting display unit 15 including features of a variation broadcasting unit 44. The indication, instead of being displayed, may be broadcasted in the form of audio output, printout, or any other suitable means.

In case the indication of the standard deviation being greater than the present standard deviation is broadcasted, an operator determines that the measured weight variation is too large to be corrected by the correction value. Then, the operator may, for example, adjust the stability time and/or filter constant and then restarts the corrective operation.

Thus, the corrective operation decides and stores the correction values used to correct the errors of the measured weight values of the weighing hoppers 8.

Then, the balance weights mounted in the weighing hoppers 8 are removed, and the normal operation mode is run, with the combination scale being fed with the articles to be weighed. In the normal operation mode, the measured weight values of the weighing hoppers 8 are corrected based on the correction values decided in the corrective operation mode. Specifically, the measured weight values are corrected by subtracting the correction values from the measured weight values, as expressed in the following formula.

Corrected measured weight value=measured weight value−correction value

In the normal operation mode, the combinatorial computations are executed based on the corrected measured weight values.

As described so far, the corrective operation is carried out prior to the normal operation to calculate the correction values for correction of the errors of the measured weight values of the weighing hoppers 8. During the normal operation, the measured weight values of the weighing hoppers 8 are corrected by the correction values, and the combinatorial computations are executed based on the corrected measured weight values. Thus, the combinatorial computations are executed based on the measured weight values improved in accuracy. This may conduce to improvements in weighing accuracy.

Next, processing steps in the corrective operation according to this embodiment are hereinafter described referring to flow charts.

Figure 7:
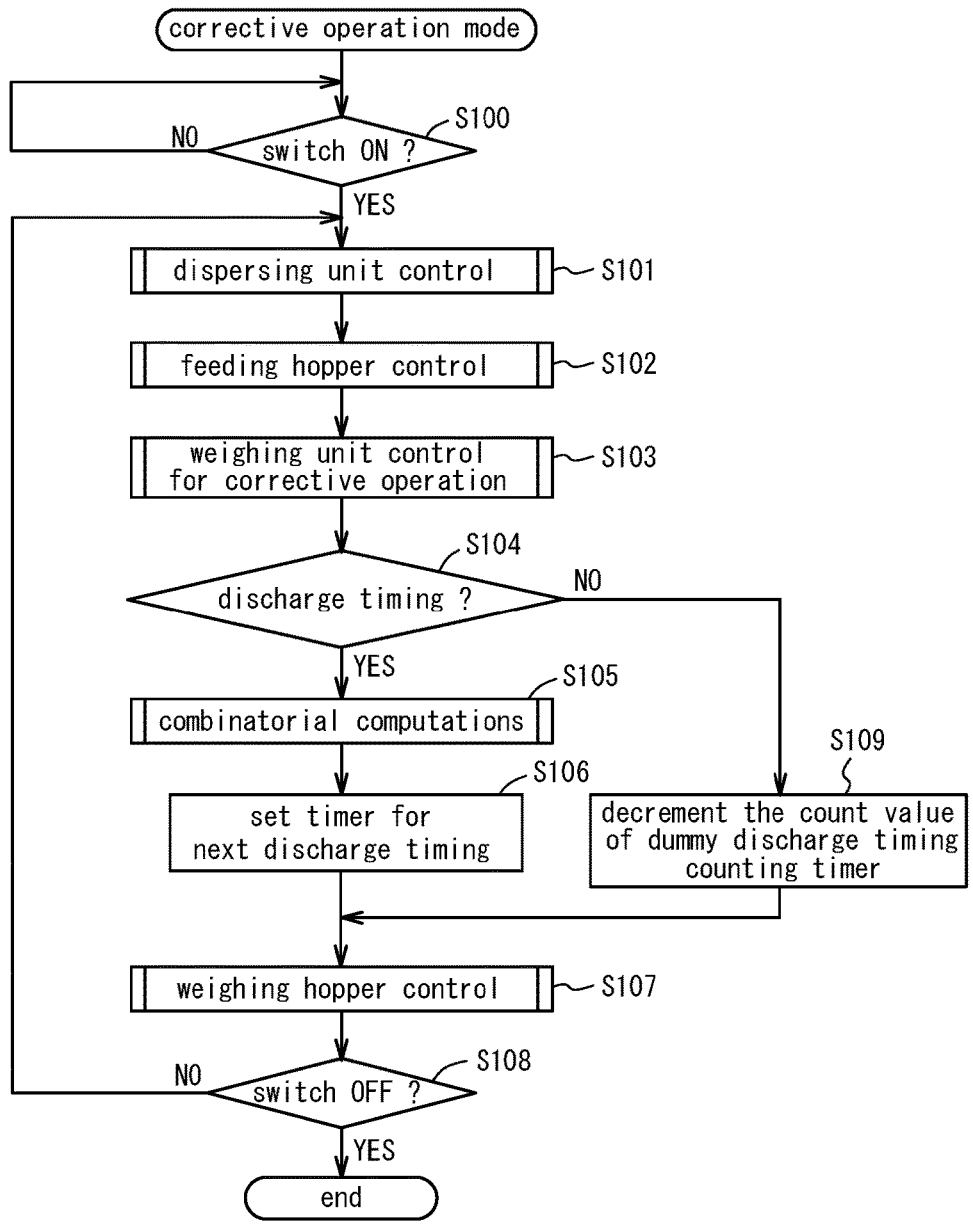
FIG. 7 is a flow chart, schematically illustrating processing steps during the corrective operation mode.

FIG. 7 is a flow chart, schematically illustrating the overall operation during the corrective operation mode. Among the processing steps illustrated in FIG. 7, a dispersing unit control in Step S101, a feeding hopper control in Step S102, a weighing unit control for corrective operation in Step S103, a combinatorial computation in Step S105, and a weighing hopper control in Step S107 will be described in further detail referring to FIGS. 8 to 12.

In the corrective operation mode, the dispersing feeder 2 is not fed with the articles to be weighed. Therefore, there is no article actually discharged out of the hoppers 5 and 8 when their discharge gates 5a and 8a are opened and closed or transported downward by driving the feeders 2 and 14.

Referring to FIG. 7, an operator commences with setting the corrective operation mode and the known weights on the operation setting display unit 15. Then, the operator turns on an operation switch to start the corrective operation. When the corrective operation starts (Step S100), the computation controller 30 of the control device 10 controls a dispersing unit including the dispersing feeder 2 and the linear feeders 14 (Step S101). This step, by controlling the dispersing unit, vibrates the feeder pan 6 of the linear feeder 14 associated with the feeding hoppers 5 that had their discharge gates 5a opened and closed, and also vibrates the top cone 3 of the dispersing feeder 2.

Next, the computation controller 30 controls discharge gate 5a of the feeding hoppers 5. The computation controller 30 opens and closes the discharge gates 5a of the feeding hoppers 5 associated with the weighing hoppers 8 that had their discharge gate 8a opened and closed (Step S102).

Next, the computation controller 30 controls a weighing unit. The computation controller 30, assuming that the weighing hoppers 8 are fed with the articles to be weighed by opening and closing the gates 5a of the feeding hoppers 5, weighs the articles in the weighing hoppers 8 using respective ones of the weight sensors 9. The computation controller 30 obtains the weight values from the weight signals of the weight sensors 9 to calculate the measured weight values (Step S103).

Then, the computation controller 30 determines whether the timing of discharging the articles from an optimal quantity combination of weighing hoppers 8 has arrived (Step S104). When determined that the discharge timing is yet to arrive, the computation controller 30 decrements by 1 the count value of a built-in discharge timing counting timer to count the discharge timing (Step S109), and the computation controller 30 proceeds to Step S107.

When determined in Step S104 that the discharge timing has arrived, the computation controller 30 executes the combinatorial computations based on the measured weight values corresponding to the balance weights mounted in the weighing hoppers 8 (Step S105). The combinatorial computations select an optimal quantity combination of weighing hoppers 8 having a combinational weight; a total weight obtained by variously combining the measured weight values, equal to a target combinational weight, or greater than and most approximate to the target combinational weight. Then, the computation controller 30 proceeds to Step S106.

In Step S106, the computation controller 30 sets the discharge timing counting timer to start to count the next discharge timing. Then, computation controller 30 proceeds to Step S107.

In Step S107, the computation controller 30 controls the weighing hoppers. The computation controller 30 opens and closes the discharge gates 8a of the optimal quantity combination of weighing hoppers 8 selected by the combinatorial computations. Then, the computation controller 30 proceeds to Step S108.

In Step S108, the computation controller 30 determines whether the operation switch has been turned off. The computation controller 30 returns to Step S101 when determined that the operation switch has not been turned off, while ending the corrective operation when determined that the operation switch has been turned off.

Figure 8:
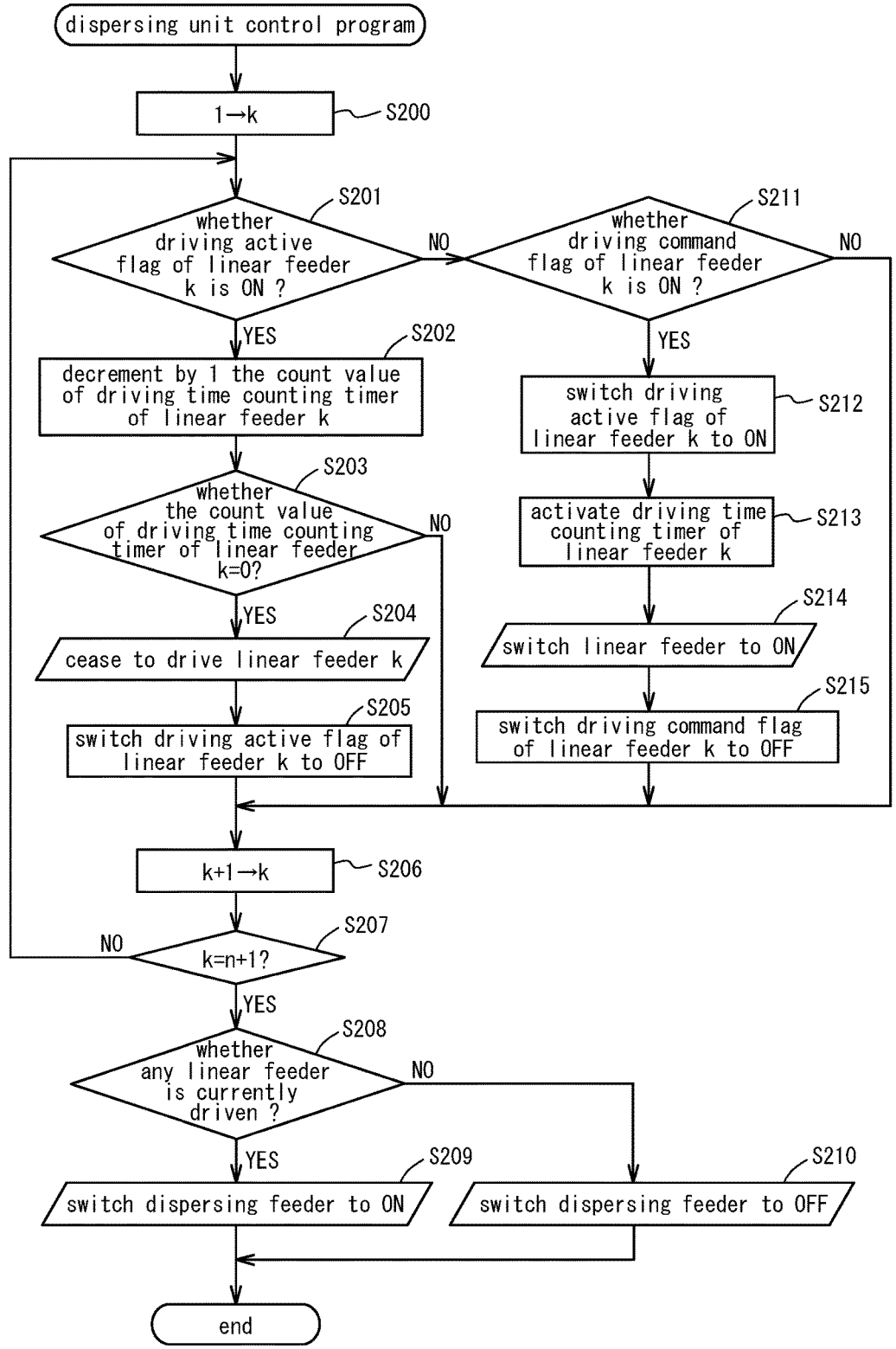
FIG. 8 is a flow chart of processing steps carried out by a dispersing feeder and a linear feeder.

FIG. 8 is a flow chart of processing steps in the dispersing unit control program of Step S101 illustrated in FIG. 7.

To start with, the computation controller 30 sets an initial value "1" as number k used to identify the first one of the linear feeders 14 (Step S200). Then, the computation controller 30 determines whether a driving active flag of the linear feeder 14 ($k$) is "ON", indicating that the linear feeder 14 ($k$) is currently driven (Step S201). When determined that the driving active flag is "ON", it is confirmed that the linear feeder 14 ($k$) is currently driven. Then, the computation controller 30 decrements by 1 the count value of a built-in driving time counting timer associated with the linear feeder 14 ($k$) that counts the driving time of the linear feeder 14 ($k$) (Step S202), and the computation controller 30 proceeds to Step S203. These processing steps illustrated in FIG. 8 are performed at regular time intervals, in which the count value of the driving time counting timer is decremented by 1 to count the driving time of the linear feeder 14 ($k$)

In Step S203, the computation controller 30 determines whether the count value of the driving time counting timer associated with the linear feeder 14 ($k$) is "0", i.e., whether the driving time counting timer is counted up, indicating that the driving time of the linear feeder 14 (k) is over.

When determined in Step S203 that the count value of the driving time counting timer associated with the linear feeder 14 (k) is "0", the computation controller 30 ceases to drive the linear feeder 14 (k) (Step S204) and switches the driving active flag of the linear feeder 14 (k) to "OFF" (Step S205). Then, the computation controller 30 proceeds to Step S206. When determined in Step S203 that the count value of the driving time counting timer associated with the linear feeder 14 (k) is not "0", the computation controller 30 proceeds to Step S206.

In Step S206, the computation controller 30 adds "1" to the number k that identifies the linear feeder 14 and determines whether the number k equals to "n+1", i.e., whether all of the linear feeders 14 have been processed (Step S207). When determined in Step S207 that the number k is not equal to "n+1", the computation controller 30 returns to Step S201 to process the next linear feeder 14 likewise. When determined in Step S207 that the number k equals to "n+1", the computation controller 30 determines whether any one of the linear feeders 14 is currently driven (Step S208). When determined in Step S208 that any one of the linear feeders 14 is currently driven, the computation controller 30 switches the dispersing feeder 2 to "ON" to start to drive the dispersing feeder 2 or continues to drive the dispersing feeder 2 (Step S209). Then, the processing steps end. When determined in Step S208 that none of the linear feeders 14 is currently driven, the computation controller 30 switches the dispersing feeder 2 to "OFF" to cease to drive the dispersing feeder 2 (Step S210). Then, the processing steps end.

When determined in Step S201 that the driving active flag of the linear feeder 14 (k) is not "ON", the computation controller 30 determines whether a driving command flag of the linear feeder 14 (k) for starting to drive the linear feeder 14 (k) is "ON" (Step S211). When determined in Step S201 that the driving command flag of the linear feeder 14 (k) is not "ON", the computation controller 30 proceeds to Step S206. When determined that the driving command flag of the linear feeder 14 (k) is "ON", the computation controller 30 proceeds to Step S212. In Step S212, the computation controller 30 switches the driving active flag of the linear feeder 14 (k) to "ON", indicating that the linear feeder 14 (k) is currently driven. Then, the computation controller 30 activates the driving time counting timer that counts the driving time of the linear feeder 14 (k) to start to count the driving time (Step S213), and then switches the linear feeder 14 (k) to "ON" to start to drive the linear feeder 14 (k) (Step S214). The computation controller 30 further switches the driving command flag of the linear feeder 14 (k) to "OFF" (Step S215), and then proceeds to Step S206.

Figure 9:
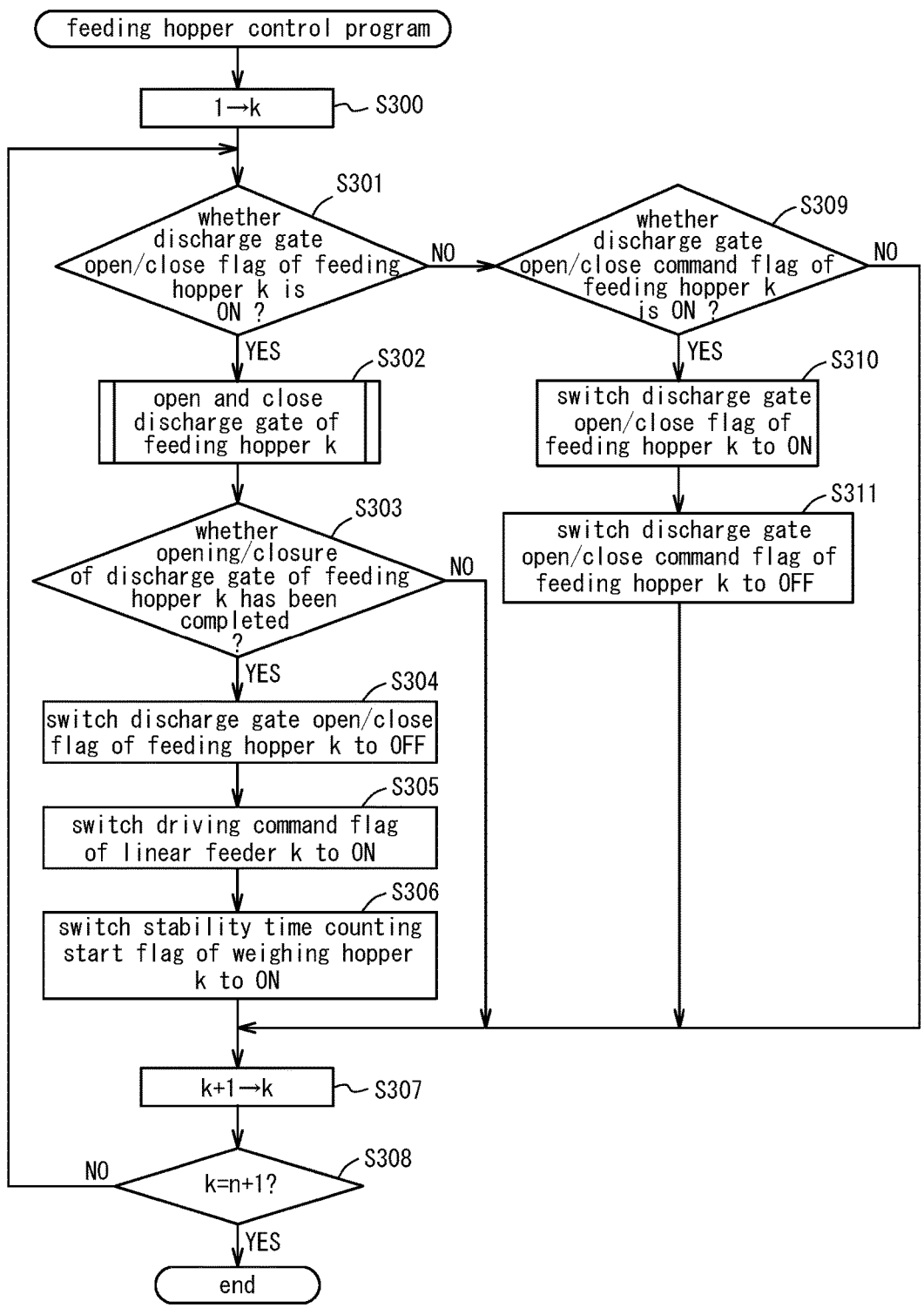
FIG. 9 is a flow chart of processing steps carried out by a feeding hopper.

FIG. 9 is a flow chart of processing steps in the feeding hopper control program of Step S102 illustrated in FIG. 7.

To start with, the computation controller 30 sets an initial value "1" as number k used to identify the first one of the feeding hoppers 5 (Step S300), and determines whether a discharge gate open/close flag of the feeding hopper 5 (k) is "ON", indicating its discharge gate 5a should be opened and closed (Step S301). When determined that the discharge gate open/close flag is "ON", the computation controller 30 opens and closes the discharge gate 5a of the feeding hopper 5 (k) (Step S302), and then determines whether the opening and closure of the discharge gate 5a of the feeding hopper 5 (k) have been completed (Step S303). When determined that the opening and closure have been completed, the computation controller 30 switches the discharge gate open/close flag of the feeding hopper 5 (k) to "OFF" (Step S304), and then proceeds to Step S305.

At this point, the feeding hopper 5 (k) has had its discharge gate 5a (k) opened and closed to virtually discharge the articles to be weighed. In Step S305, therefore, the computation controller 30, in order to virtually feed new articles to be weighed, switches the driving command flag of the linear feeder 14 (k) associated with the feeding hopper 5 (k) to "ON", and switches a stability time counting start flag of the weighing hopper 8 (k) to "ON" to start to count its stability time (Step S306). Then, the computation controller 30 proceeds to Step S307. When determined in Step S303 that the opening and closure of the discharge gate 5a of the feeding hopper 5 (k) have yet to be completed, the computation controller 30 proceeds to Step S307.

When determined in Step S301 that the discharge gate open/close flag of the feeding hopper 5 (k) is not "ON", the computation controller 30 determines whether a discharge gate open/close command flag of the feeding hopper 5 (k) is "ON" (Step S309). When determined that the discharge gate open/close command flag of the feeding hopper 5 (k) is "ON", the computation controller 30 switches the discharge gate open/close flag of the feeding hopper 5 (k) to "ON", indicating that its discharge gate 5a should be opened and closed (Step S310). Then, the computation controller 30 switches the discharge gate open/close command flag of the feeding hopper 5 (k) to "OFF" (Step S311), and then proceeds to Step S307.

In Step S307, the computation controller 30 adds "1" to the number k that identifies the feeding hopper 5 and determines whether the number k equals to "n+1", i.e., whether all of the feeding hoppers 5 have been processed (Step S308). When determined in Step S308 that the number k is not equal to "n+1", the computation controller 30 returns to Step S301 to process the next feeding hopper 5 likewise. When determined in Step S308 that the number k equals to "n+1", the processing steps end.

Figure 10:
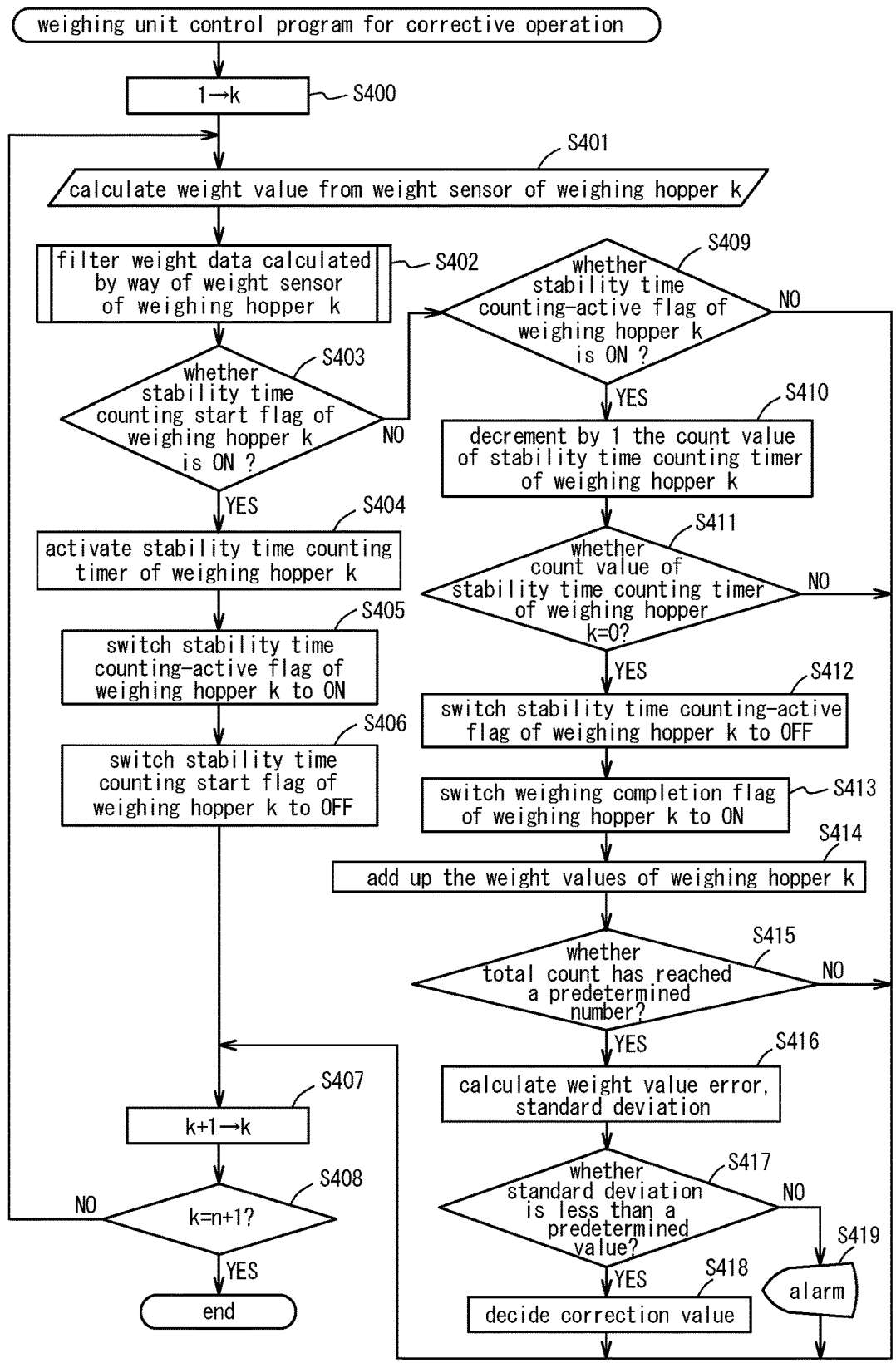
FIG. 10 is a flow chart of processing steps carried out by a weighing unit during the corrective operation mode.

FIG. 10 is a flow chart of processing steps in the weighing unit control program of Step S103 illustrated in FIG. 7, including steps of calculating errors and deciding correction values.

First, the computation controller sets an initial value "1" as number k used to identify the first one of the weighing hoppers 8 (Step S400). Then, the computation controller 30 calculates the weight value from the weight signal of the weight sensor 9 associated with the weighing hopper 8 (k) (Step S401), and applies a filtering process to weight data outputted from the weight sensor 9 associated with the weighing hopper 8 (k) (Step S402). The computation controller 30 determines whether the stability time counting start flag of the weighing hopper 8 (k) is "ON", indicating that its stability time should start to be counted (Step S403). When determined that the stability time counting start flag is "ON", the computation controller 30 prompts a built-in stability time counting timer associated with the weighing hopper 8 (k) to start to count the stability time (Step S404). Further, the computation controller 30 switches a stability time counting-active flag of the weighing hopper 8 (k) to "ON", indicating that the stability time of the weighing hopper 8 (k) is currently counted (Step S405), and switches the stability time counting start flag of the weighing hopper 8 (k) to "OFF" (Step S406). Then, the computation controller 30 proceeds to Step S407.

When determined in Step S403 that the stability time counting start flag of the weighing hopper 8 (k) is not "ON", the computation controller 30 determines whether the stability time counting-active flag of the weighing hopper 8 (k)

is "ON, indicating that the stability time is currently counted (Step S409). When determined that the stability time counting-active flag is "ON", the computation controller 30 decrements by 1 the count value of the stability time counting timer associated with the weighing hopper 8 ($k$) (Step S410), and then proceeds to Step S411. These processing steps illustrated in FIG. 10 are performed at regular time intervals, in which the count value of the stability time counting timer is decremented by 1 to count the stability time of the weighing hopper 8 ($k$).

In Step S411, the computation controller 30 determines whether the count value of the stability time counting timer associated with the weighing hopper 8 ($k$) is "0", i.e., whether the stability time counting timer is counted up, indicating that the stability time is over.

When determined in Step S411 that the count value of the stability time counting timer associated with the weighing hopper 8 ($k$) is "0", indicating that the stability time is over, the computation controller 30 switches the stability time counting-active flag of the weighing hopper 8 ($k$) to "OFF" (Step S412). The computation controller 30 obtains the weight value from the filtered weight data to calculate the measured weight value of the weighing hopper 8 ($k$), and switches a weighing completion flag of the weighing hopper 8 ($k$) to "ON" (Step S413).

Then, the computation controller 30 adds up the calculated measured weight values (Step S414) and determines whether the total count of the calculated measured weight values of the articles has reached a predetermined number (Step S415). The computation controller 30 proceeds to Step S407 when determined that the total count has not reached the predetermined number, while proceeding to Step S416 when determined that the total count has reached the predetermined number.

In Step S416, the computation controller 30 calculates an average value of the counted predetermined number of measured weight values of the weighing hopper 8 ($k$), and calculates an error between the average value and the known weight of the balance weight in the weighing hopper 8 ($k$). Further, the computation controller 30 calculates the standard deviation; variation of the counted predetermined number of measured weight values of the weighing hopper 8 ($k$), and determines whether the calculated standard deviation is less than a predetermined value (Step S417). When determined in Step S417 that the calculated variation is less than the predetermined value, the computation controller 30 decides the calculated error as the correction value (Step S418), and proceeds to Step S407. When determined in Step S417 that the calculated standard deviation is not less than the predetermined value, the computation controller 30 broadcasts the result by displaying an indication of large variation on the operation setting display unit 15 (Step S419). Then, the computation controller 30 proceeds to Step S407.

In Step S407, the computation controller 30 adds "1" to the number k that identifies the weighing hopper 8 and determines whether the number k equals to "n+1", i.e., whether all of the weighing hoppers 8 have been processed (Step S408). When determined in Step S408 that the number k is not equal to "n+1", the computation controller 30 returns to Step S401 and processes the next weighing hopper 8 likewise. When determined in Step S408 that the number k equals to "n+1", the processing steps end.

Figure 11:
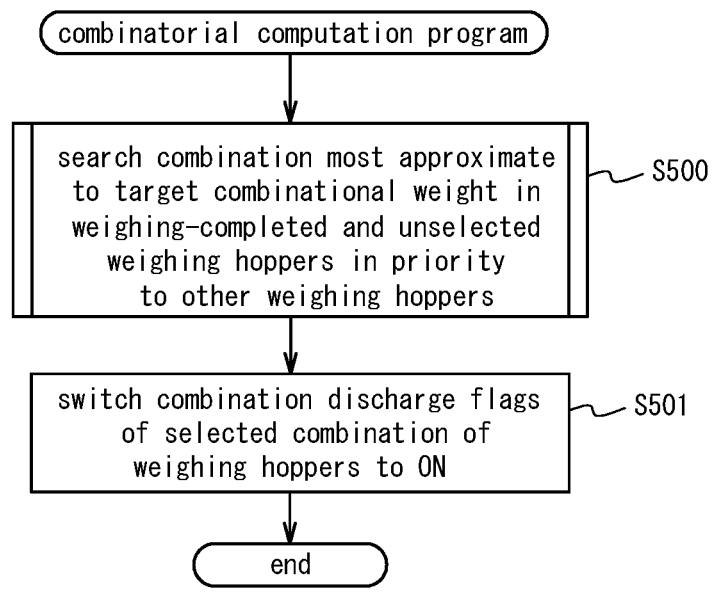
FIG. 11 is a flow chart of combinatorial computation processing steps.

FIG. 11 is a flow chart of processing steps in the combinatorial computation program of Step S105 illustrated in FIG. 7.

Of all of the weighing-completed weighing hoppers, any weighing hoppers 8 are identified that are continuously left unselected as an optimal quantity combination of weighing hoppers a certain number of times or more. Then, an optimal quantity combination of weighing hoppers 8 most approximate to the target combinational weight is searched in the weighing hoppers 8 thus identified in priority to the others (Step S500). Then, combination discharge flags of the selected weighing hoppers 8 are switched to "ON", indicating that the articles should be discharged from these weighing hoppers (Step S501). Then, the processing steps end.

Figure 12:
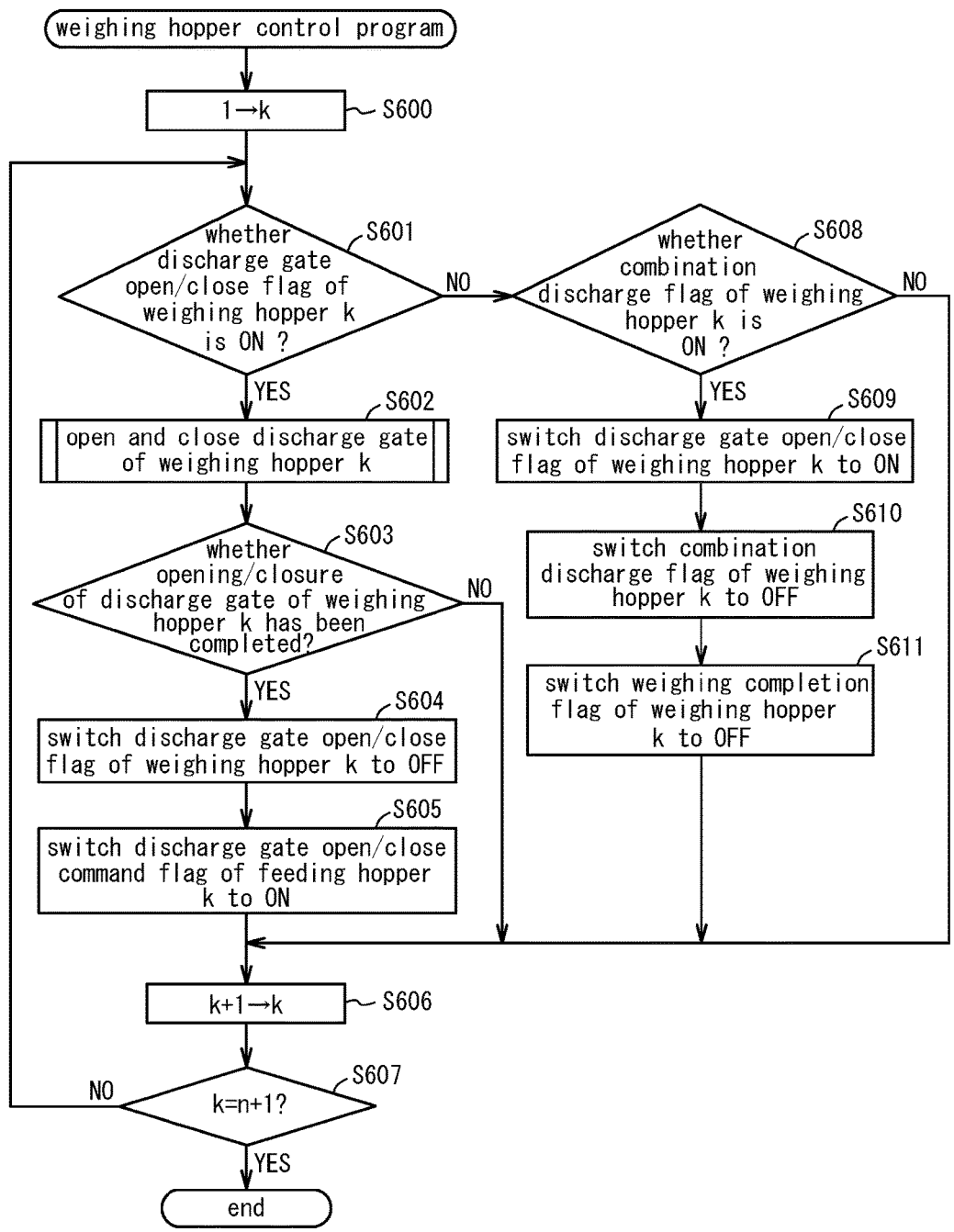
FIG. 12 is a flow chart of processing steps carried out by a weighing hopper.

FIG. 12 is a flow chart of processing steps in the weighing hopper control program of Step S107 illustrated in FIG. 7.

To start with, the computation controller 30 sets an initial value "1" as number k used to identify the first one of the weighing hoppers 8 (Step S600), and determines whether the discharge gate open/close flag of the weighing hopper 8 ($k$) is "ON", indicating that its discharge gate 8$a$ should be opened and closed (Step S601). When determined in Step S601 that the discharge gate open/close flag of the weighing hopper 8 ($k$) is "ON", the computation controller 30 opens and closes the discharge gate 8$a$ of the weighing hopper 8 ($k$) (Step S602), and determines whether the opening and closure of the discharge gate 8$a$ of the weighing hopper 8 ($k$) have been completed (Step S603). When determined that the opening and closure of the discharge gate 8$a$ of the weighing hopper 8 ($k$) have been completed, the computation controller 30 proceeds to Step S604. When determined that the opening and closure of the discharge gate 8$a$ of the weighing hopper 8 ($k$) have not yet been completed, the computation controller 30 proceeds to Step S606.

In Step S604, the computation controller 30 switches the discharge gate open/close flag of the weighing hopper 8 ($k$) to "OFF". Assuming that the discharge gate 8$a$ of the weighing hopper 8 ($k$) has been opened and closed to discharge the articles, the computation controller 30 switches the discharge gate open/close command flag of the feeding hopper 5 ($k$) associated with the weighing hopper 8 ($k$) to "ON" (Step S605) to feed the weighing hoppers 8 with new articles to be weighed. Then, the computation controller 30 proceeds to Step S606.

When determined in Step S601 that the discharge gate open/close flag of the weighing hopper 8 ($k$) is not "ON", the computation controller 30 determines whether a combination discharge flag of the weighing hopper 8 ($k$) is "ON" (Step S608). When determined that the combination discharge flag of the weighing hopper 8 ($k$) is "ON", the computation controller 30 switches the discharge gate open/close flag of the weighing hopper 8 ($k$) to "ON" (Step S609). Then, the computation controller 30 switches the combination discharge flag of the weighing hopper 8 ($k$) to "OFF" (Step S610), and switches the weighing completion flag of the weighing hopper 8 ($k$) to "OFF" (Step S611). Then, the computation controller 30 proceeds to Step S606.

When determined in Step S608 that the combination discharge flag is not "ON", the computation controller 30 proceeds to Step S606.

In Step S606, the computation controller 30 adds "1" to the number k that identifies the weighing hopper 8 and determines whether the number k equals to "n+1", i.e., whether all of the weighing hoppers 8 have been processed (Step S607). When determined that the number k is not equal to "n+1", the computation controller 30 returns to Step S601 and processes the next weighing hopper 8 likewise. When determined in Step S607 that the number k equals to "n+1", the processing steps end.

Next is described the normal operation mode in which the combination scale is actually fed with the articles to be weighed and operated as usual. In the normal operating mode, the weighing unit control for corrective operation of Step S103 illustrated in FIG. 7 is different in its operation, and the discharge timing is the timing of the discharge request signal being outputted from the packaging machine 13. The rest of the operation is primarily similar to the operation during the corrective operation mode. Therefore, the description hereinafter given focuses on how to control the weighing unit when the combination scale is normally operating.

Figure 13:
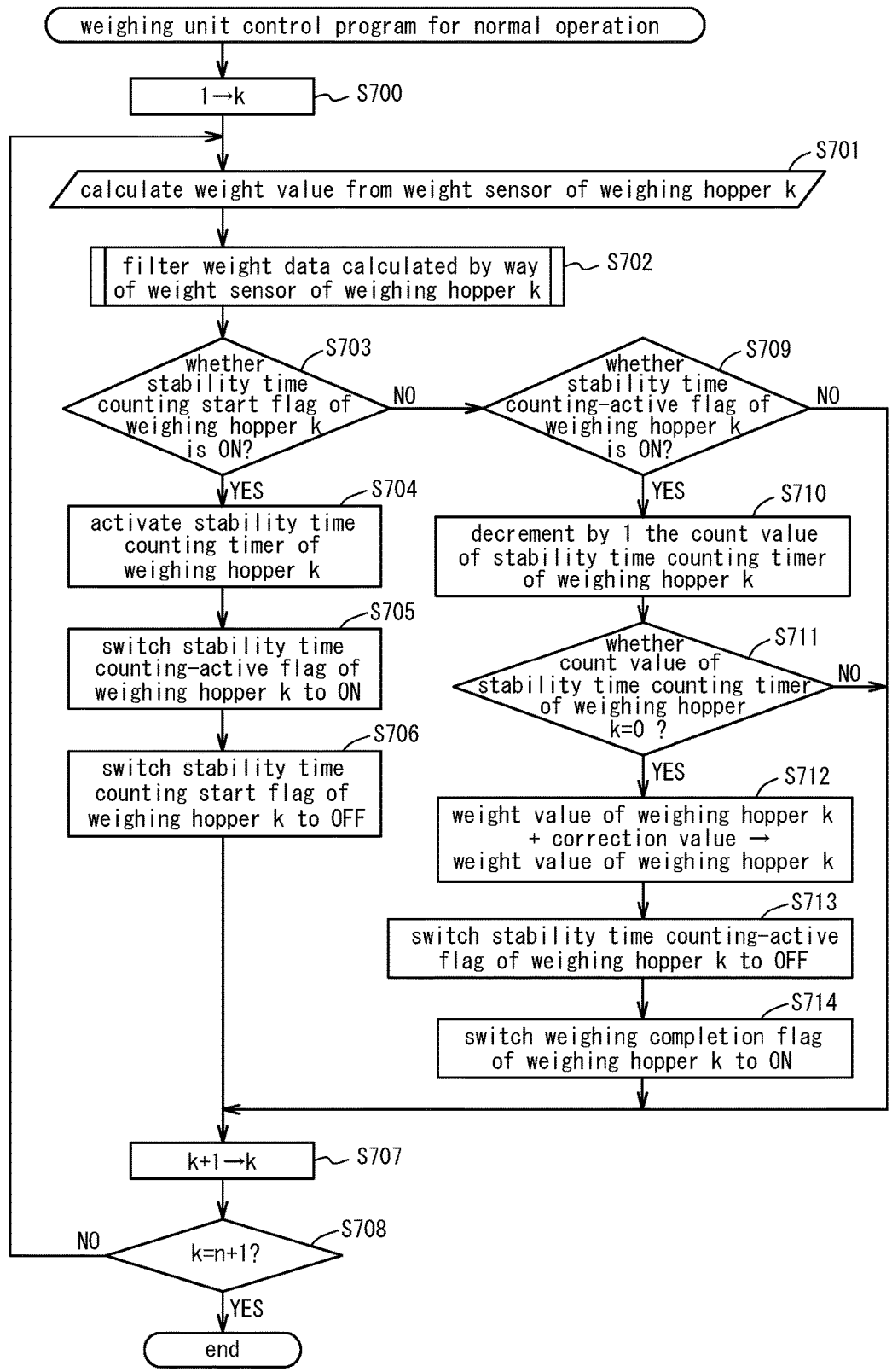
FIG. 13 is a flow chart of processing steps carried out by the weighing unit during a normal operation mode.

FIG. 13 is a flow chart of processing steps in the weighing unit control program of Step S103 illustrated in FIG. 7 when the combination scale is normally operating.

First, the computation controller sets an initial value "1" as number k used to identify the first one of the weighing hoppers 8 (Step S700). Then, the computation controller 30 calculates the weight value from the weight signal of the weight sensor 9 associated with the weighing hopper 8 (k) (Step S701), and applies a filtering process to weight data outputted from the weight sensor 9 associated with the weighing hopper 8 (k) (Step S702). The computation controller 30 determines whether the stability time counting start flag of the weighing hopper 8 (k) is "ON", indicating that its stability time should start to be counted (Step S703). When determined that the stability time counting start flag is "ON", the computation controller 30 sets the built-in stability time counting timer for the weighing hopper 8 (k) to start to count the stability time (Step S704). Further, the computation controller 30 switches the stability time counting-active flag of the weighing hopper 8 (k) to "ON", indicating that the stability time of the weighing hopper 8 (k) is currently counted (Step S705), and switches the stability time counting start flag of the weighing hopper 8 (k) to "OFF" (Step S706). Then, the computation controller 30 proceeds to Step S707.

When determined in Step S703 that the stability time counting start flag of the weighing hopper 8 (k) is not "ON", the computation controller 30 determines whether the stability time counting-active flag of the weighing hopper 8 (k) is "ON, indicating that the stability time is currently counted (Step S709). When determined that the stability time counting-active flag is "ON", the computation controller 30 decrements by 1 the count value of the stability time counting timer for the weighing hopper 8 (k) (Step S710). Then, the computation controller 30 proceeds to Step S711. These processing steps illustrated in FIG. 13 are performed at regular time intervals, in which the count value of the stability time counting timer is decremented by 1 to count the stability time of the weighing hopper 8 (k).

In Step S711, the computation controller 30 determines whether the count value of the stability time counting timer for the weighing hopper 8 (k) is "0", i.e., whether the stability time counting timer is counted up, indicating that the stability time is over.

When determined in Step S711 that the count value of the stability time counting timer for the weighing hopper 8 (k) is "0", the computation controller 30 adds the correction value calculated in the corrective operation mode to the measured weight value of the weighing hopper 8 (k) to correct the measured weight value (Step S712). Then, the computation controller proceeds to Step S713.

In Step S713, the computation controller 30 switches the stability time counting-active flag of the weighing hopper 8 (k) to "OFF" (Step S713). Then, the computation controller 30 switches the weighing completion flag of the weighing hopper 8 (k) to "ON" (Step S714), and then proceeds to Step S707. When determined in Step S711 that the count value of the stability time counting timer for the weighing hopper 8 (k) is not "0", the computation controller 30 proceeds to Step S707.

In Step S707, the computation controller 30 adds "1" to the number k that identifies the weighing hopper 8 and determines whether the number k equals to "n+1", i.e., whether all of the weighing hoppers 8 have been processed (Step S708). When determined in Step S708 that the number k is not equal to "n+1", the computation controller 30 returns to Step S701 and processes the next weighing hopper 8 likewise. When determined in Step S708 that the number k equals to "n+1", the processing steps end.

As described so far, the errors of the measured weight values of the weighing hoppers 8 are corrected based on the correction values calculated in the corrective operation mode as illustrated in Step S712, and the combinatorial computations are executed based on the corrected measured weight values as illustrated in FIG. 11. This may conduce to improvements in weighing accuracy.

Second Embodiment

In the corrective operation mode described in the first embodiment, the corrective operation of the combination scale is carried out, with the test articles; balance weights of known weights being mounted in the weighing hoppers 8 in a manner that the test articles are not dischargeable from the weighing hoppers 8 when their discharge gates 8a are opened. In another embodiment of this invention, the corrective operation may be carried out without mounting test articles such as balance weights in the weighing hoppers 8.

The embodiment hereinafter described provides the following technical features that allow the corrective operation of the combination scale to be carried out, by simple operation, without having to mount test articles, such as balance weights, in the weighing hoppers 8.

In this embodiment, corrective operation mode is provided, in which the corrective operation of the combination scale is carried out in a simulated manner, specifically, without feeding the combination scale with articles to be weighed and without mounting test articles in the weighing hoppers 8. This corrective operation mode is hereinafter referred to as a dummy corrective operation mode.

Figure 14:
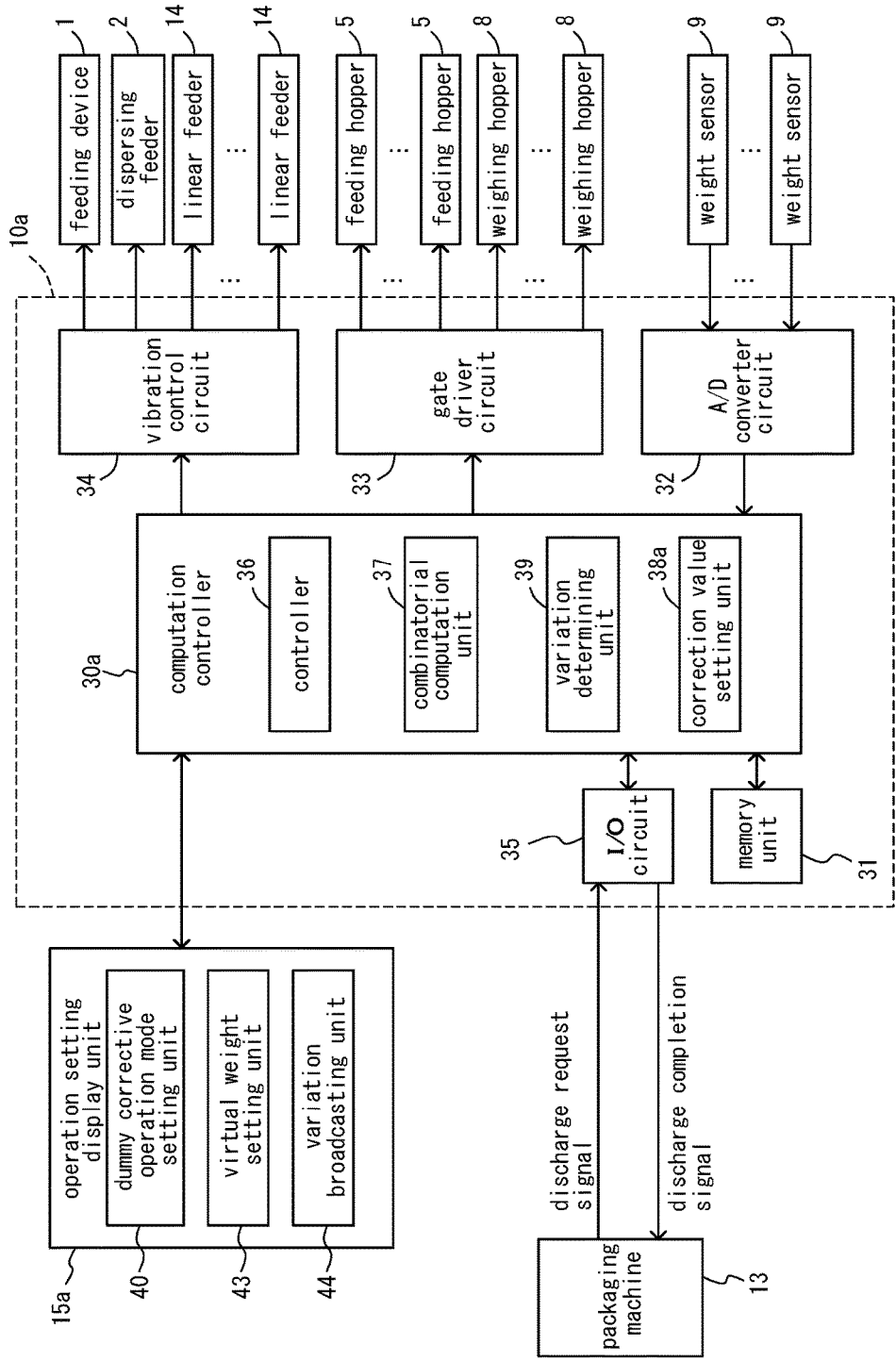
FIG. 14 is a block diagram, illustrated correspondingly to FIG. 2, according to another embodiment of the invention.

FIG. 14 is a block diagram, illustrated correspondingly to FIG. 2, according to this embodiment. The same structural elements of this drawing as those illustrated in FIG. 2 are indicated by the same reference signs.

An operation setting display unit 15a includes features of a dummy corrective operation mode setting unit 40 and a virtual weight setting unit 43. 1The dummy corrective operation mode setting unit 40 sets the dummy corrective operation mode as an operation mode to be run. The virtual weight setting unit 43 sets the known virtual weights of virtual articles assumed to be mounted in the weighing hoppers 8 in the dummy corrective operation mode.

Referring to the drawing, a computation controller 30a includes a correction value deciding unit 38a. As in the corrective operation mode according to the first embodiment, the correction value deciding unit 38a decides correction values for use in correcting the errors of the measured weight values of the weighing hoppers 8 based on the measured weight values calculated as described below from the weight signals associated with the weighing hoppers 8 and the known virtual weights of virtual articles assumed to be mounted in the weighing hoppers 8.

Figure 15:
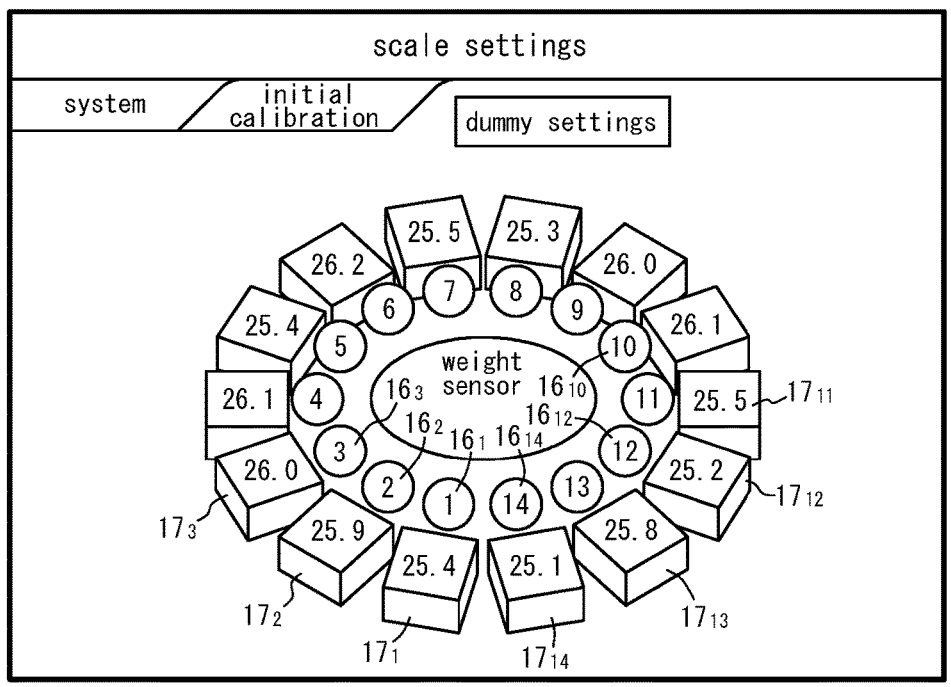
FIG. 15 is a drawing of an exemplified setting display screen at the time of setting and running a dummy corrective operation mode.

FIG. 15 is a drawing, illustrating an exemplified setting display screen displayed on the operation setting display unit 15 at the time of setting and running the dummy corrective operation mode.

The dummy corrective operation mode is set and run for a simulated corrective operation of the combination scale without actually feeding the combination scale with articles to be weighed and without mounting test articles such as balance weights in the weighing hoppers 8. The dummy corrective operation carried out during the dummy corrective operation mode requires the combination scale to be operated based on the assumption that the weighing hoppers 8, which are really empty, are containing virtual articles to be weighed. To this end, weights of these virtual articles assumed to be present in the weighing hoppers 8 are set as virtual weight values.

FIG. 15 shows an exemplified setting display screen displayed on the operation setting display unit 15 to set these virtual weight values.

Referring to FIG. 15, numbers "1" to "14" signifying the weight sensors 9 provided correspondingly to the 14 weighing hoppers 8 of the combination scale are displayed in 14 circular number display regions $16_1$ to $16_{14}$ circumferentially arranged. On the outer sides of the number display regions $16_1$ to $16_{14}$ are displayed blockish virtual weight display regions $17_1$ to $17_{14}$ respectively for the number display regions $16_1$ to $16_{14}$. The virtual weight values are set and displayed on the virtual weight display regions $17_1$ to $17_{14}$.

In the illustrated example, different virtual weight values are set for the respective weighing hoppers 8; "25.4 (g)" for the first weighing hopper 8 numbered "1", "25.9 (g)" for the second weighing hopper 8 numbered "2", "26.0 (g)" for the third weighing hopper 8 numbered "3", and the same goes for the rest of the weighing hoppers 8, ending with "25.1 (g)" for the 14th weighing hopper 8 numbered "14".

The first weighing hopper 8 numbered "1" is assumed to contain virtual articles of the weight "25.4 (g)", the second weighing hopper 8 numbered "2" is assumed to contain virtual articles of the weight "25.9 (g)", the third weighing hopper 8 numbered "3" is assumed to contain virtual articles of the weight "26.0 (g)", and the same goes for the rest of the weighing hoppers 8, ending with the 14th weighing hopper 8 numbered "14" assumed to contain virtual articles of the weight "25.1 (g)".

For the virtual weight values to be set in the illustrated example, an operator sets an average weight value of the articles to be fed in the 1st to 14th weighing hoppers 8 on the operation setting display unit 15. Then, the computation controller 30 automatically varies the average weight value to calculate and set the virtual weight values of the 1st to 14th weighing hoppers 8.

Figure 16:
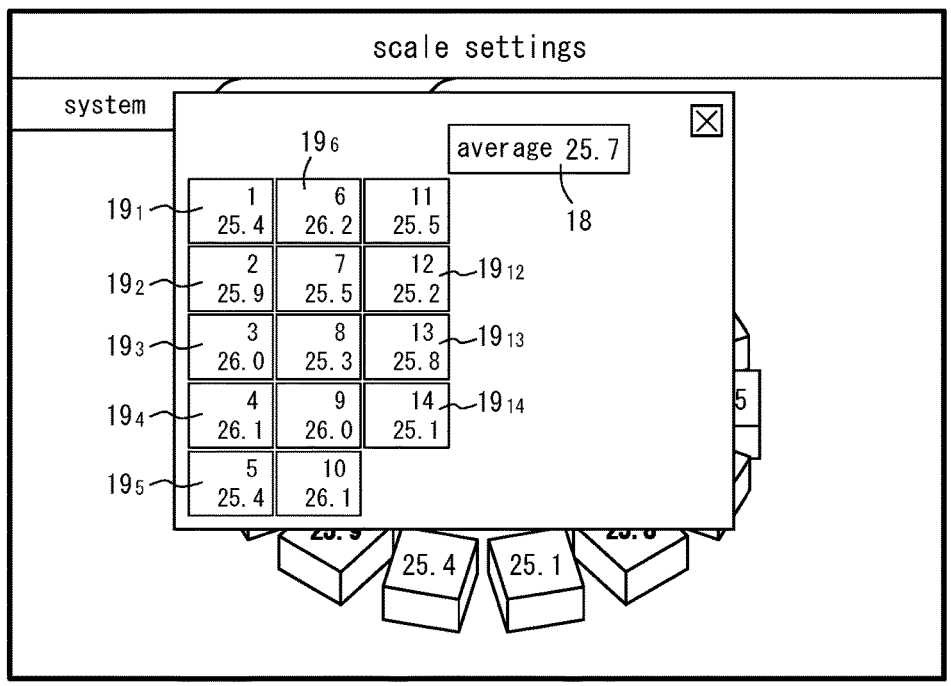
FIG. 16 is a drawing of an exemplified setting display screen for displaying virtual weights during the dummy corrective operation mode.

FIG. 16 shows an exemplified setting display screen to automatically set the virtual weight values as per the average virtual weight value.

Referring to FIG. 16, the operator inputs, for example, "25.7 (g)" as the average weight value of the articles to be virtually fed in the 1st to 14th weighing hoppers 8, and the inputted average weight value is displayed in a rectangular average value display region 18. The computation controller 30 varies the set average weight value to automatically calculate the virtual weight values for the 1st to 14th weighing hoppers 8, and displays the calculated virtual weight values in the rectangular display regions $19_1$ to $19_{14}$, with the numbers "1" to "14" of the weighing hoppers 8. This embodiment, instead of directly setting the virtual weight values, indirectly sets the virtual weight values by way of the previously obtained average weight value of the articles to be fed in the weighing hoppers 8.

The average weight value of the articles to be fed in the weighing hoppers 8, i.e., target weight value of the articles to be fed in the weighing hoppers 8, may preferably be calculated as described below so as to calculate as many effective combinations as possible in the combinatorial computations for a higher combination accuracy.

As for "n" number in total of weighing hoppers 8 where "n" is an odd number, a weight value calculated by dividing the target combinational weight by (n−1)/2 or (n+1)/2, should be the target weight value of the articles to be fed in the weighing hoppers 8. When the total number "n" is an even number, a weight value calculated by dividing the target combinational weight by n/2, should be the target weight value of the articles to be fed in the weighing hoppers 8.

According to this embodiment, the total number "n" of the weighing hoppers 8 is an even number, 14. Therefore, a weight value calculated by dividing the target combinational weight by n/2=7, should be the target weight value of the articles to be fed in the weighing hoppers 8, i.e., average weight value of the articles to be fed in the weighing hoppers 8.

In the combination scale, the total number "n" of the weighing hoppers 8 is a known number. When the operator activates the dummy corrective operation mode and inputs the target combinational weight, the computation controller 30 divides the target combinational weight by (n−1)/2, (n+1)/2, or n/2 depending on whether the total number "n" is an odd number or an even number to calculate the average weight value of articles to be fed in the weighing hoppers 8. The computation controller 30 then automatically varies the calculated average weight value to calculate and set the virtual weight values. When the operator runs the dummy corrective operation mode and inputs the target combinational weight value, for example, the virtual weight values may be automatically calculated and indirectly set, instead of being directly set by the operator.

Figure 17:
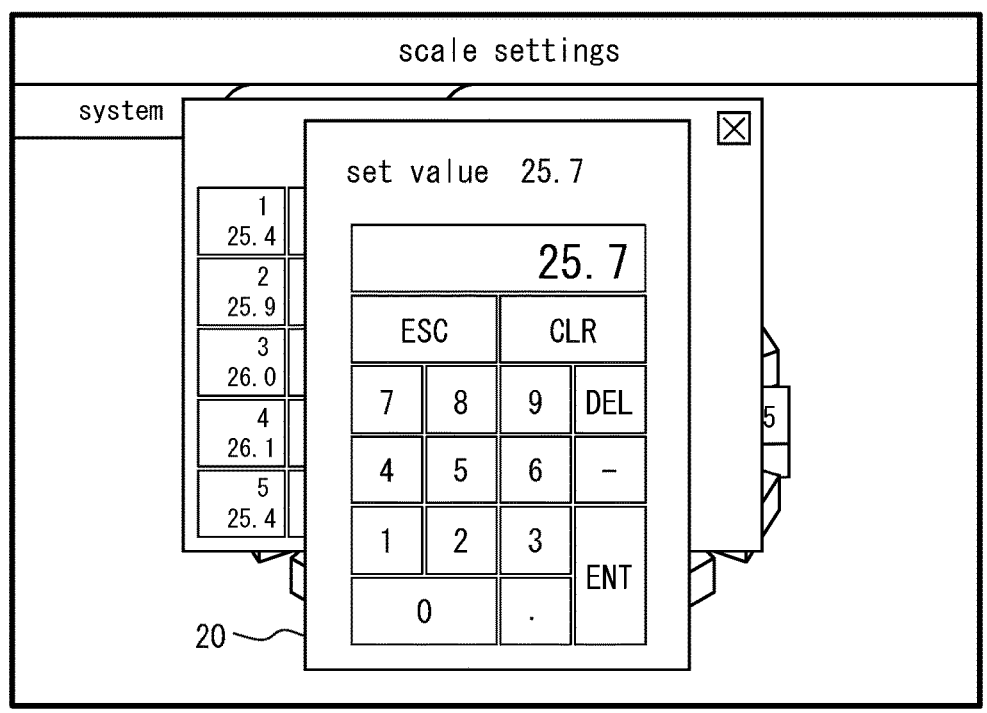
FIG. 17 is a drawing of another exemplified setting display screen for displaying virtual weights during the dummy corrective operation mode.

In this embodiment, the operator may manipulate the operation setting display unit 15a to invoke a numeric keypad window 20 and directly and individually set the virtual weight values of the weighing hoppers 8, as illustrated on the exemplified setting display screen of FIG. 17.

In the dummy corrective operation mode, the measured weight values of the weighing hoppers 8 are thus obtained, with the really empty weighing hoppers 8 being assumed to contain the virtual articles of the virtual weights thus set.

In the dummy corrective operation mode, therefore, the measured weigh values of the weighing hoppers 8 are calculated in a manner different to the normal operation mode and the corrective operation mode described in the first embodiment.

Hereinafter is described how to calculate the measured weigh values of the weighing hoppers 8 in the dummy corrective operation mode.

In the dummy corrective operation mode according to this embodiment, initially provided zero-point correction values (zero-point calibration values), which are used to calculate the measured weight values of the articles fed in the weighing hoppers 8, are corrected based on the set virtual weight values, and the corrected zero-point correction values are used to calculate the measured weight values of the articles to be weighed.

In the zero-point correction initially performed, a tare weight (weights obtained by adding a weight of the weighing hopper 8 per se and weights of support members supporting the weighing hopper 8) is conventionally decided so that the measured weight value, which is obtained from the weight signal of the weight sensor 9 when the weighing hopper 8 is empty, becomes zero after the tare weight is subtracted from this measured weight value. Then, the tare weight thus calculated is used as an initial zero-point correction value (zero-point calibration value).

At the time of weighing the zero point-adjusted articles, the initial zero-point correction value, or tare weight, is subtracted from the measured weight value obtained from the weight signal of the weight sensor 9 to calculate the measured weight value of the articles in the weighing hopper 8.

When the initial zero-point correction value, or tare weight, is subtracted from the measured weight value obtained from the weight signal of the weight sensor 9 arranged correspondingly to the weighing hopper 8 in case the weighing hopper 8 is empty, containing no article to be weighed, therefore, the calculated weight value of the articles in the weighing hopper 8 is "0 (g)".

In the normal operation mode and the corrective operation mode according to the first embodiment, the conventional zero-point adjustment is carried out to calculate the measured weight values of the weighing hoppers 8.

In the dummy corrective operation mode according to this embodiment, on the other hand, the initial zero-point correction values are corrected based on the set virtual weight values to calculate the corrected zero-point correction values. The corrected zero-point correction value is the initial zero-point correction value corrected so as to calculate the virtual weight value as the measured weight value of the articles assumed to be present in the really empty weighing hopper 8.

In the initial zero-point adjustment, 1,520 (g), for example, is the measured weight value obtained from the weight signal of the weight sensor 9 arranged correspondingly to the really empty weighing hopper 8 when the weighing hopper 8 is empty, containing no article to be weighed. Then, this weight, 1,520 (g), is the tare weight, i.e., weights obtained by adding weight of the weighing hopper 8 per se and weights of support members supporting the weighing hopper 8. Then, 1,520 (g) is stored as the initial zero-point correction value (Wzi).

At the time of weighing the zero point-adjusted articles, the initial zero-point correction value (Wzi) is subtracted from the measured weight value (Wm) obtained from the weight signal of the weight sensor 9 to calculate the measured weight value (Wn) of the articles to be weighed. This is expressed by the following formula.

$$Wn=(Wm-Wzi)$$

If 1,545 (g) is the measured weight value (Wm) obtained from the weight signal of the weight sensor 9, the initial zero-point correction value (Wzi), 1,520 (g), is subtracted from 1,545 (g) to calculate the measured weight value (Wn) of the articles to be weighed, 25 (g), as expressed by the following formula.

$$Wn=Wm-Wzi=1,545-1,520=25$$

In the dummy corrective operation mode according to this embodiment, however, the initial zero-point correction value (Wzi) is corrected so as to calculate the virtual weight value (Ws) as the measured weight value (Wn) of the articles assumed to be present in the weighing hopper 8 that is actually empty, containing no article to be weighed.

If 1,520 (g) is the initial zero-point correction value (Wzi) as mentioned earlier, and the set virtual weight value (Ws) is 25.5 (g), the corrected zero-point correction value (Wzir) is calculated to satisfy the following formula.

$$25.5=1,520-Wzir$$

Therefore, the corrected zero-point correction value (Wzir) is calculated by the following formula.

$$Wzir=1,520-25.5=1494.5$$

Thus, 1,494.5 (g) is the corrected zero-point correction value (Wzir) as a result of correcting the initial zero-point correction value (Wzi), 1,520 (g).

Therefore, the measured weight value (Wn) of the articles to be weighed in the weighing hopper 8 is calculated from the following formula, where the corrected zero-point correction value Wzir is subtracted from the weight value (Wm) obtained from the weight signal of the weight sensor 9.

$$Wn=Wm-Wzir$$

For example, the measured weight value (Wm) obtained from the weight signal of the weight sensor 9 arranged correspondingly to the really empty weighing hopper 8 equals to the initial zero-point correction value, or tare weight, 1,520 (g). Then, the corrected zero-point correction value (Wzir), 1,494.5 (g), is subtracted from the measured weight value (Wm) to calculate the measured weight value (Wn) of the articles to be weighed. As a result, the virtual weight value (Ws), 25.5 g, is calculated as expressed by the following formula.

$$Wn=Wm-Wzir=1,520-1,494.5=25.5=Ws$$

In the dummy corrective operation mode, the virtual weight values are thus calculated as the weights of the articles assumed to be present in the actually empty weighing hoppers 8.

Thus, the initial zero-point correction value is corrected in response to the virtual weight value, in other words, the zero point, reference point of weight calculation, is shifted correspondingly to each virtual weight value. Then, the virtual weight value may be calculated as the measured weight value of the articles assumed to be present in the actually empty weighing hopper 8.

In the combination scale, however, there may be errors between the weights of the articles weighed by the weighing hoppers 8 and real weights of the articles in the weighing hoppers 8, i.e., virtual weight values under the influences from vibrations of the combination scale per se and floor vibrations in a production site where the combination scale is installed.

In the dummy corrective operation mode, as well as in the corrective operation mode according to the first embodiment, an error between the virtual weight and the average value of the measured weight values of the weighing hopper 8 is calculated and decided as the correction value.

The dummy corrective operation mode is primarily run similarly to the corrective operation mode according to the first embodiment, except the calculation of measured weight values using the corrected zero-point correction values.

Specifically, the computation controller 30a, in the dummy corrective operation mode, corrects the weight values obtained from the weight signals of the weight sensors 9 respectively for the weighing hoppers 8 using the corrected zero-point correction values to calculate the measured weight values. Then, the computation controller 30a executes the combinatorial computations based on the calculated measured weight values of the articles to select an optimal quantity combination of weighing hoppers 8.

Further, the computation controller 30 calculates an average value of a predetermined number of measured weight values obtained by the calculation for each of the weighing hoppers 8, and calculates an error from the obtained average value and the virtual weight as expressed by the following formula.

Error=average of a predetermined number of measured weight values−virtual weight The computation controller 30a stores therein the calculated errors as the correction values.

Upon the arrival of the article discharge timings spaced apart at certain time intervals, the computation controller 30 opens and closes the discharge gates 8a of the optimal quantity combination of weighing hoppers 8 to discharge the articles from these hoppers. Next, the computation controller 30 opens and closes the discharge gates 5a of the associated feeding hoppers 5 in order to virtually feed the weighing hoppers 8 with articles to be weighed after their gates 8a are opened and closed. Next, the computation controller 30 drives the associated linear feeders 14 for a preset period of time to virtually feed the feeding hoppers 5 with articles to be weighed after their gates 5a are opened and closed. Then, the computation controller 30 drives the dispersing feeder 2 for a preset period of time to virtually feed the linear feeders 14 with articles to be weighed. The computation controller 30a repeatedly carries out such a weighing cycle including the above actions.

Similarly to the corrective operation mode according to the first embodiment, the dummy corrective operation mode includes the remaining prevention measure described earlier. Specifically, in case any weighing hoppers 8 are found to be unselected as an optimal quantity combination of weighing hoppers a certain number of times in a row, combinatorial computations are executed to force such weighing hoppers 8 to be included in the optimal quantity combinations. Then, all of the weighing hoppers 8 will be ultimately selected as optimal quantity combinations of weighing hoppers.

During the normal operation of the combination scale in which the articles to be weighed are actually fed, such an accident as adhesion of the articles to the weighing hoppers 8 may possibly occur, changing the zero point. This may result in variability of the measured weight value even when articles of the same weight are thrown in the weighing hopper 8. To avoid that, the combination scale includes a zero-point self-adjusting feature for updating the zero-point correction value at regular intervals during the normal operation. This self-adjusting feature, however, is deactivated during the dummy corrective operation mode in which the virtual weights are calculated. In the dummy corrective operation mode, the corrected zero-point correction values; initial zero-point correction values preceding the normal operation that are corrected by the virtual weights, are used without being updated, instead of the updated zero-point correction values.

As in the corrective operation mode according to the first embodiment, the variation determining unit 39 of the computation controller 30a calculates the standard deviation; variation of a predetermined number of measured weight values for each weighing hopper 8. When the calculated standard deviation of the measured weight values is greater than a predetermined standard deviation, the weighing hopper 8 undergoing such large variation is identified, and an indication of large variation is broadcasted by being displayed on the operation setting display unit 15 including features of the variation broadcasting unit 44.

As described thus far, the correction values for correction of the errors of the measured weight values of the weighing hoppers 8 are decided in the dummy corrective operation mode.

In the normal operation mode of the combination scale in which the articles to be weighed are actually fed, the correction values decided in the dummy corrective operation mode are used to correct the measured weight values of the weighing hoppers 8 as in the normal operation mode according to the first embodiment. Then, the combinatorial computations are executed based on the corrected measured weight values.

Any other technical features of the combination scale are the same as described in the first embodiment.

In the corrective operation mode according to the first embodiment, the test articles, for example, balance weights as substantially heavy as the articles to be weighed, are mounted in the weighing hoppers 8 in a manner that the test articles are not dischargeable from the weighing hoppers 8 when their discharge gates 8a are opened, and the corrective operation of the combination scale is then carried out. This, however, requires time and labor to prepare the balance weights to be mounted in the respective weighing hoppers 8, to mount the balance weights in the weighing hoppers 8 not to be discharged for the corrective operation, and to remove and manage the balance weights when the corrective operation is over.

In this embodiment, on the other hand, the dummy corrective operation of the combination scale may be carried out by way of simple settings including setting of the dummy corrective operation mode, without the need to feed the combination scale with articles to be weighed and to mount test articles in the weighing hoppers 8.

The dummy corrective operation mode may be easily run without mounting the balance weights in the weighing hoppers 8. The dummy corrective operation mode, therefore, may be useful for adjustments of the combination scale just installed in a production site or before the normal operation starts. This operation mode is also useful when the types of products to be weighed are changed.

The first and second embodiments of this invention may be combined into a new additional embodiment, in which either one of two corrective operation modes may be selectable; corrective operation mode in which the test articles, for example, balance weights, are mounted in the weighing hoppers 8 and dummy corrective operation mode in which such test articles as balance weights are unused.

The invention claimed is:
1. A combination scale comprising:
a dispersing feeder configured to receive articles to be weighed and disperse the articles around;
a plurality of linear feeders disposed around the dispersing feeder and configured to receive the articles to be weighed from the dispersing feeder and discharge the articles to be weighed from respective delivery ends of the linear feeders;
a plurality of feeding hoppers configured to receive and temporarily store the articles to be weighed discharged from the delivery ends of the linear feeders and then discharge the articles to be weighed downward;
a plurality of weighing hoppers configured to receive and temporarily store the articles to be weighed discharged from the feeding hoppers and then discharge the articles to be weighed;
a plurality of weight sensors configured to detect weights of respective ones of the weighing hoppers;

a combinatorial computation unit configured to calculate measured weight values of the articles to be weighed stored in the weighing hoppers from weight signals of the weight sensors, the combinatorial computation unit being further configured to execute combinatorial computations based on the measured weight values of the articles that are calculated; and a control device configured to control the weighing hoppers based on a result obtained from the combinatorial computations, the control device being further configured to control the dispersing feeder, the linear feeders, and the feeding hoppers, the combination scale being configured to include, as operation modes:

a normal operation mode; and a corrective operation mode configured to decide correction values, the correction values being adapted for use in correcting errors of the measured weight values calculated from the weight signals of the weight sensors, wherein, in the normal operation mode, the combinatorial computation unit is configured to correct, using the correction values, the measured weight values of the articles to be weighed stored in the weighing hoppers that are calculated from the weight signals of the weight sensors, and to execute the combinatorial computations based on the measured weight values that are corrected, wherein the dispersing feeder is not fed with the articles to be weighed and test articles of known weights are mounted in the weighing hoppers in the corrective operation mode, and the combination scale further includes a correction value deciding unit configured to decide the correction values in the corrective operation mode based on the known weights and measured weight values of the test articles in the weighing hoppers calculated by the combinatorial computation unit.

2. The combination scale as claimed in claim 1, further comprising:

a variation determining unit configured to calculate, in the corrective operation mode, a variation in the measured weight values of each one of the weighing hoppers obtained from the weight signals of the weight sensors, the variation determining unit being further configured to determine whether the variation is greater than a predetermined variation; and a variation broadcasting unit configured to broadcast an indication of the variation being greater than the predetermined variation when determined so by the variation determining unit.

3. The combination scale as claimed in claim 1, wherein the correction value deciding unit is configured to calculate the error based on a predetermined number of the measured weight values and the known weight of the test articles for each one of the weighing hoppers, and the correction value deciding unit is further configured to use the errors calculated as the correction values.

4. The combination scale as claimed in claim 1, further comprising a corrective operation mode setting unit configured to be manipulated to set the corrective operation mode.

5. A combination scale comprising:

a dispersing feeder configured to receive articles to be weighed and disperse the articles around;

a plurality of linear feeders disposed around the dispersing feeder and configured to receive the articles to be weighed from the dispersing feeder and discharge the articles to be weighed from respective delivery ends of the linear feeders;

a plurality of feeding hoppers configured to temporarily store the articles to be weighed discharged from the delivery ends of the linear feeders and then discharge the articles to be weighed downward;

a plurality of weighing hoppers configured to receive and temporarily store the articles to be weighed discharged from the feeding hoppers and then discharge the articles to be weighed;

a plurality of weight sensors configured to detect weights of respective ones of the weighing hoppers;

a combinatorial computation unit configured to calculate measured weight values of the articles to be weighed stored in the weighing hoppers from weight signals of the weight sensors, the combinatorial computation unit being further configured to execute combinatorial computations based on the measured weight values of the articles that are calculated; and a control device configured to control the weighing hoppers based on a result obtained from the combinatorial computations, the control device being further configured to control the dispersing feeder, the linear feeders, and the feeding hoppers, the combination scale being configured to include, as operation modes:

a normal operation mode; and a corrective operation mode configured to decide correction values, the correction values being adapted for use in correcting errors of the measured weight values calculated from the weight signals of the weight sensors, wherein, in the normal operation mode, the combinatorial computation unit is configured to correct, using the correction values, the measured weight values of the articles to be weighed stored in the weighing hoppers that are calculated from the weight signals of the weight sensors, and to execute the combinatorial computations based on the measured weight values that are corrected, wherein the dispersing feeder is not fed with the articles to be weighed and the weighing hoppers are assumed to contain virtual articles of known virtual weights in the corrective operation mode, and the combination scale further includes a correction value deciding unit configured to decide the correction values in the corrective operation mode based on the known virtual weights and measured weight values of virtual articles in the weighing hoppers calculated by the combinatorial computation unit.

6. The combination scale as claimed in claim 5, wherein the combinatorial computation unit is further configured to calculate the measured weight values of the virtual articles in the weighing hoppers in the corrective operation mode based on corrected zero-point correction values obtained by correcting zero-point correction values of the weighing hoppers using the known virtual weights, the zero-point correction values being adapted for use in calculating the measured weight values from the weight signals of the weight sensors.

7. The combination scale as claimed in claim 5, wherein the correction value deciding unit is further configured to calculate the error based on a predetermined number of the measured weight values and the known virtual weight of the virtual articles for each one of the weighing hoppers, and the correction value deciding unit is further configured to use the errors calculated as the correction values.

* * * * *